(12) United States Patent
Depelteau et al.

(10) Patent No.: US 8,886,677 B1
(45) Date of Patent: Nov. 11, 2014

(54) INTEGRATED SEARCH ENGINE DEVICES THAT SUPPORT LPM SEARCH OPERATIONS USING SPAN PREFIX MASKS THAT ENCODE KEY PREFIX LENGTH

(75) Inventors: Gary Depelteau, Ottawa (CA); David W. Carr, Ottawa (CA)

(73) Assignee: NetLogic Microsystems, Inc., Irvine, CA (US)

( * ) Notice: Subject to any disclaimer, the term of this patent is extended or adjusted under 35 U.S.C. 154(b) by 375 days.

(21) Appl. No.: 11/768,646

(22) Filed: Jun. 26, 2007

Related U.S. Application Data

(63) Continuation-in-part of application No. 11/184,243, filed on Jul. 19, 2005, now Pat. No. 7,747,599.

(60) Provisional application No. 60/590,500, filed on Jul. 23, 2004, provisional application No. 60/642,799, filed on Jan. 11, 2005.

(51) Int. Cl.
G06F 17/30 (2006.01)

(52) U.S. Cl.
USPC .......................................................... 707/797

(58) Field of Classification Search
CPC ................................................. G06F 17/30327
USPC .................. 707/706, 712, 758, 791, 999.003, 707/999.1, 999.103, 797
See application file for complete search history.

(56) References Cited

U.S. PATENT DOCUMENTS

| | | | |
|---|---|---|---|
| 4,464,650 A | 8/1984 | Eastman et al. | |
| 4,606,002 A | 8/1986 | Waisman et al. | |
| 5,228,115 A | 7/1993 | Natarajan | |
| 5,430,869 A | 7/1995 | Ishak et al. | |
| 5,446,887 A | 8/1995 | Berkowitz | |
| 5,475,837 A | 12/1995 | Ishak et al. | |
| 5,560,007 A | 9/1996 | Thai | |
| 5,644,763 A | 7/1997 | Roy | |
| 5,666,494 A | 9/1997 | Mote, Jr. | |
| 5,758,024 A | 5/1998 | Alleva | |
| 5,758,356 A | 5/1998 | Hara et al. | |
| 5,787,430 A | 7/1998 | Doeringer et al. | |
| 5,812,853 A | 9/1998 | Carroll et al. | |
| 5,812,996 A | 9/1998 | Rubin et al. | |

(Continued)

FOREIGN PATENT DOCUMENTS

WO WO2004088548 10/2004
WO WO2004088548 A1 10/2004

OTHER PUBLICATIONS

Microsoft Computer Dictionary, 2002, Microsoft Press, Fifth Edition, p. 329.*

(Continued)

*Primary Examiner* — Jacob F Bétit
*Assistant Examiner* — Kristopher Andersen
(74) *Attorney, Agent, or Firm* — Sterne, Kessler, Goldstein & Fox PLLC

(57) ABSTRACT

A pipelined search engine supports a tree of search keys therein that utilizes span prefix masks to assist in longest prefix match (LPM) detection when the tree is searched. Each of a plurality of the span prefix masks encodes a prefix length of a search key to which the span prefix mask is associated and a value of another search key in the tree that is a prefix match to the search key to which the span prefix mask is associated.

21 Claims, 15 Drawing Sheets

(56) References Cited

U.S. PATENT DOCUMENTS

| | | | |
|---|---|---|---|
| 5,813,000 A | 9/1998 | Furlani | |
| 5,822,749 A | 10/1998 | Agarwal | |
| 5,897,655 A | 4/1999 | Mallick | |
| 5,918,245 A | 6/1999 | Yung | |
| 5,924,115 A | 7/1999 | Von Herzen et al. | |
| 6,035,326 A | 3/2000 | Miles et al. | |
| 6,041,053 A | 3/2000 | Douceur et al. | |
| 6,098,150 A | 8/2000 | Brethour et al. | |
| 6,115,792 A | 9/2000 | Tran | |
| 6,138,123 A | 10/2000 | Rathbun | |
| 6,219,662 B1 | 4/2001 | Fuh et al. | |
| 6,389,507 B1 | 5/2002 | Sherman | |
| 6,401,117 B1 | 6/2002 | Narad et al. | |
| 6,404,752 B1 | 6/2002 | Allen, Jr. et al. | |
| 6,421,730 B1 | 7/2002 | Narad et al. | |
| 6,430,527 B1 | 8/2002 | Waters et al. | |
| 6,441,053 B1 | 8/2002 | Klein et al. | |
| 6,460,112 B1 | 10/2002 | Srinivasan et al. | |
| 6,460,120 B1 | 10/2002 | Bass et al. | |
| 6,480,839 B1 | 11/2002 | Whittington et al. | |
| 6,490,592 B1 * | 12/2002 | St. Denis et al. | 1/1 |
| 6,522,632 B1 | 2/2003 | Waters et al. | |
| 6,526,055 B1 | 2/2003 | Perlman et al. | |
| 6,532,457 B1 * | 3/2003 | Tal et al. | 707/1 |
| 6,535,491 B2 | 3/2003 | Gai et al. | |
| 6,539,369 B2 | 3/2003 | Brown | |
| 6,553,370 B1 | 4/2003 | Andreev et al. | |
| 6,564,211 B1 * | 5/2003 | Andreev et al. | 1/1 |
| 6,611,832 B1 | 8/2003 | van Lunteren | |
| 6,614,789 B1 | 9/2003 | Yazdani et al. | |
| 6,633,865 B1 | 10/2003 | Liao | |
| 6,636,849 B1 | 10/2003 | Tang et al. | |
| 6,636,956 B1 | 10/2003 | Venkatachary et al. | |
| 6,662,287 B1 | 12/2003 | Andreev et al. | |
| 6,691,124 B2 | 2/2004 | Gupta et al. | |
| 6,694,323 B2 | 2/2004 | Bumbulis | |
| 6,697,276 B1 | 2/2004 | Pereira et al. | |
| 6,707,693 B1 | 3/2004 | Ichiriu | |
| 6,757,779 B1 | 6/2004 | Nataraj et al. | |
| 6,768,739 B1 | 7/2004 | Kobayashi et al. | |
| 6,778,530 B1 | 8/2004 | Greene | |
| 6,782,382 B2 | 8/2004 | Lunteren | |
| 6,831,850 B2 | 12/2004 | Pereira et al. | |
| 6,839,800 B2 | 1/2005 | Stark | |
| 6,845,024 B1 | 1/2005 | Wanzakhade et al. | 365/49 |
| 6,859,455 B1 | 2/2005 | Yazdani et al. | |
| 6,868,414 B2 | 3/2005 | Khanna et al. | |
| 6,928,430 B1 | 8/2005 | Chien et al. | |
| 6,934,795 B2 | 8/2005 | Nataraj et al. | |
| 6,941,314 B2 | 9/2005 | Andreev et al. | |
| 6,944,709 B2 | 9/2005 | Nataraj et al. | |
| 6,963,868 B2 | 11/2005 | Basso et al. | |
| 7,007,027 B2 | 2/2006 | Najork et al. | |
| 7,016,904 B1 | 3/2006 | Grove et al. | |
| 7,017,021 B2 | 3/2006 | Gupta et al. | |
| 7,023,807 B2 | 4/2006 | Michels et al. | |
| 7,035,844 B2 | 4/2006 | Andreev et al. | |
| 7,047,317 B1 | 5/2006 | Huie et al. | |
| 7,062,499 B2 | 6/2006 | Nehru et al. | |
| 7,076,602 B2 | 7/2006 | Stark et al. | |
| 7,107,263 B2 | 9/2006 | Yianilos et al. | |
| 7,110,407 B1 | 9/2006 | Khanna | |
| 7,162,572 B2 | 1/2007 | Somasundaram | |
| 7,231,383 B2 | 6/2007 | Andreev et al. | |
| 7,246,198 B2 | 7/2007 | Nataraj et al. | |
| 7,257,530 B2 | 8/2007 | Yin | |
| 7,289,979 B2 | 10/2007 | Wilson | |
| 7,292,162 B2 | 11/2007 | Samasundaram | |
| 7,383,276 B2 | 6/2008 | Lomet | |
| 7,426,518 B2 | 9/2008 | Venkatachary et al. | |
| 7,437,354 B2 | 10/2008 | Venkatachary et al. | |
| 7,478,109 B1 | 1/2009 | Panigrahy et al. | |
| 7,571,156 B1 | 8/2009 | Gupta et al. | |
| RE40,932 E | 10/2009 | Diede et al. | |
| 7,603,346 B1 | 10/2009 | Depelteau et al. | 707/9 |
| 7,653,619 B1 | 1/2010 | Depelteau et al. | 707/3 |
| 7,697,518 B1 | 4/2010 | de Wit | 370/389 |
| 7,725,450 B1 | 5/2010 | Depelteau et al. | 707/706 |
| 7,747,599 B1 | 6/2010 | Depelteau et al. | 707/706 |
| 7,805,427 B1 | 9/2010 | Depelteau | 707/5 |
| 7,831,626 B1 | 11/2010 | Depelteau | 707/707 |
| 2001/0043602 A1 | 11/2001 | Brown | |
| 2002/0089937 A1 | 7/2002 | Venkatachary et al. | |
| 2002/0116526 A1 | 8/2002 | Brown | |
| 2002/0146009 A1 | 10/2002 | Gupta et al. | |
| 2002/0147721 A1 | 10/2002 | Gupta et al. | |
| 2002/0152413 A1 | 10/2002 | Waters et al. | |
| 2002/0161969 A1 | 10/2002 | Nataraj et al. | |
| 2003/0009453 A1 | 1/2003 | Basso et al. | |
| 2003/0009466 A1 | 1/2003 | Ta et al. | |
| 2003/0093613 A1 | 5/2003 | Sherman | |
| 2003/0093646 A1 | 5/2003 | Stark | |
| 2003/0123397 A1 | 7/2003 | Lee et al. | |
| 2003/0123459 A1 * | 7/2003 | Liao | 370/401 |
| 2003/0163302 A1 | 8/2003 | Yin | |
| 2003/0182272 A1 | 9/2003 | Leung et al. | |
| 2003/0236793 A1 | 12/2003 | Karlsson et al. | |
| 2004/0030686 A1 | 2/2004 | Cardno et al. | |
| 2004/0059731 A1 | 3/2004 | Yianilos et al. | |
| 2004/0062208 A1 | 4/2004 | Brown et al. | |
| 2004/0083336 A1 | 4/2004 | Stark et al. | |
| 2004/0109451 A1 | 6/2004 | Huang et al. | |
| 2004/0139274 A1 * | 7/2004 | Hui | 711/108 |
| 2004/0170379 A1 | 9/2004 | Yao et al. | |
| 2004/0193619 A1 | 9/2004 | Venkatachary et al. | |
| 2004/0205229 A1 | 10/2004 | Stojancic | |
| 2004/0249803 A1 | 12/2004 | Vankatachary et al. | |
| 2005/0091443 A1 | 4/2005 | Hershkovich et al. | |
| 2005/0131867 A1 | 6/2005 | Wilson | |
| 2005/0163122 A1 | 7/2005 | Sahni et al. | |
| 2005/0195832 A1 | 9/2005 | Dharmapurikar et al. | |
| 2006/0095439 A1 | 5/2006 | Buchmann et al. | |
| 2006/0167843 A1 | 7/2006 | Allwright et al. | |
| 2006/0259682 A1 | 11/2006 | Somasundaram | |
| 2007/0038626 A1 | 2/2007 | Waters et al. | |
| 2007/0276648 A1 | 11/2007 | Andreev et al. | |

OTHER PUBLICATIONS

Chang et al. "Dynamic Routing Tables using Augmented Balanced Search Tree" *National Cheng Kung University and I-Shou University*, Admitted Prior Art, 35 pages (believed prior to Jul. 23, 2004).

Aggarwal et al. "A Model for Hierarchical Memory" *Proceedings of the Nineteenth Annual ACM Conference on Theory of Computing STOC* 305-314 (1987).

Choudhury et al. "A New Buffer Management Scheme for Hierarchical Shared Memory Switches" *IEEE/ACM Transactions on Networking (TON)* 5(5):728-738 (1997).

Djordjevic et al. "A Hierarchical Memory System Environment" *Proceedings of the 1988 Workshop on Computer Architecture Education WCAE* 6 pages (1998).

Srinivasan et al. "Fast Address Lookups Using Controlled Prefix Expansion" Washington University in St. Louis, ACM Sigmetrics '98/Performance '98 Joint International Conference on Measurement and Modeling of Computer Systems.

Final Office Action dated Nov. 24, 2009 for U.S. Appl. No. 11/685,982, 20 Pages.

Final Office Action dated Aug. 4, 2009 for U.S. Appl. No. 11/674,487, 22 Pages.

Final Office Action dated Sep. 10, 2008 for U.S. Appl. No. 11/184,243, 15 Pages.

Non-final Office Action dated Apr. 1, 2009 for U.S. Appl. No. 11/532,225, 8 Pages.

Non-final Office Action dated Jun. 25, 2009 for U.S. Appl. No. 11/184,243, 15 Pages.

Non-final Office Action dated Mar. 18, 2009 for U.S. Appl. No. 11/184,243, 15 Pages.

Non-final Office Action dated Nov. 15, 2007 for U.S. Appl. No. 11/184,243, 18 Pages.

Non-final Office Action dated Sep. 10, 2009 for U.S. Appl. No. 11/532,225, 8 Pages.

(56) References Cited

OTHER PUBLICATIONS

Non-final Office Action dated Dec. 11, 2008 for U.S. Appl. No. 11/674,474, now Issued Patent 7,603,346, 22 Pages.
Non-final Office Action dated Dec. 11, 2008 for U.S. Appl. No. 11/674,487, 23 Pages.
Non-final Office Action dated Oct. 15, 2009 for U.S. Appl. No. 11/864,290, 15 Pages.
Non-final Office Action dated Dec. 17, 2009 for U.S. Appl. No. 11/184,843, 18 Pages.
Non-final Office Action dated Jul. 21, 2009 for U.S. Appl. No. 11/685,982, 20 Pages.
Notice of Allowance dated Jan. 12, 2010 for U.S. Appl. No. 11/532,225, 6 Pages.
Notice of Allowance dated Aug. 7, 2009 for U.S. Appl. No. 11/674,474, now Issued Patent 7,603,346, 13 Pages.
Notice of Allowance dated Dec. 2, 2009 for U.S. Appl. No. 11/674,487, 11 Pages.
U.S. Appl. No. 11/184,243, Depelteau, Gary, filed Jul. 9, 2005.
U.S. Appl. No. 11/685,982, Depelteau, Gary, filed Mar. 14, 2007.
U.S. Appl. No. 11/934,240, Depelteau, Gary, filed Nov. 2, 2007.
U.S. Appl. No. 11/963,041, Depelteau, Gary, filed Dec. 21, 2007.
U.S. Appl. No. 11/963,142, Depelteau, Gary, filed Dec. 21, 2007.
U.S. Appl. No. 12/336,565, Carr, D. W., filed Dec. 17, 2008.
Final Office Action dated Mar. 26, 2010 for U.S. Appl. No. 11/864,290.
Notice of Allowance dated Mar. 31, 2010 for U.S. Appl. No. 11/685,982.
Notice of Allowance dated Apr. 2, 2010 for U.S. Appl. No. 11/184,243.
Non-Final Office Action mailed Apr. 27, 2010 for U.S. Appl. No. 11/963,041.
Non-Final Office Action mailed Jul. 21, 2010 for U.S. Appl. No. 11/963,142.
Non-Final Office Action mailed Jun. 21, 2010 for U.S. Appl. No. 11/858,441.
Notice of Allowance mailed Jul. 23, 2010 for U.S. Appl. No. 11/864,290.
Final Office Action dated Sep. 23, 2010 for U.S. Appl. No. 11/963,041.
Notice of Allowance mailed Sep. 22, 2010 for U.S. Appl. No. 11/858,441.
Final Office Action dated Dec. 30, 2010 for U.S. Appl. No. 11/963,142.
Final Office Action dated Feb. 4, 2011 for U.S. Appl. No. 11/934,240.
Non-Final Office Action dated Dec. 30, 2010 for U.S. Appl. No. 11/963,041.
Non-Final Office Action dated Oct. 22, 2010 for U.S. Appl. No. 11/934,240.
O'Connor et al., "The iFlow Address Processor,," 2001 IEEE Micro, Mar.-Apr. 2001, pp. 16-23.
Lu et al., "A B-Tree Dynamic Router-Table Design," http://www.cise.ufl.edu/~sahn/papers/btree.pdf, Admitted Prior Art, 27 pages.
Suri, et al., "Multiway Range Trees: Scalable IP Lookup with Fast Updates," http:/www.cs.edu/~varghese/PAPERS/globecome2001.pdf, Admitted Prior Art, 5 pages.
"B-Trees: Balanced Tree Data Structures," http://www.bluerwhite.org/btree/, Admitted Prior Art, Printed, 8 pages.
Answers.com, http://www.answers.com/topic/b-tree, B~tree: Information From Answers.com, Admitted prior art. 6 pages.
B*-tree, http://en.wikipedia.org/wiki/B%2A-tree, Admitted prior art. 1 page.
Bayer, R. et al., "Prefix B-Trees," ACM Trans. On Database Systems, vol. 2, No. 1, Mar. 1977, pp. 11-26.
Bender et al. "Cache-oblivious B-trees", SIAM J. Comput, 2000, pp. 1-18.
Canonical form http://en.wikipedia.org/wiki/Canonical_form, Admitted prior art, 1 pages.
Henry Hong-yi Tzeng, "Longest Prefix Search Using Compressed Trees", In Proceedings of IEEE Globe.com, 1998.
Kobayashi et al. "A Longest Prefix Match Search Engine for Multi-Gigabit IP Processing", C&C Media Research Laboratories, NEC Corporation 2000 IEEE.
Nasser Yazdani et al., "Prefix Trees: New Efficient Data Structures for Matching Strings of Different Lengths", IEEE, 2001, p. 76-85.
Network address processor makes embedded DRAM a virtue, http://www.electronicproducts.com/print.asp?ArticleURL=oct12.
oct2000, Printed Aug. 14, 2006, Admitted Prior Art, 1 page.
Srinivasan et al. "Fast Address Lookups Using Controlled Prefix Expansion" Washington University in St. Louis, ACM Sigmetrics '98/ Performance '98 Joint International Conference on Measurement and Modeling of Computer Systems.
Tree (data structure), http://en.wikipedia.org/wiki/Tree_data_structure, (Redirected from Tree data structure, Admitted prior art. 2 pages.
Uga et al. "A fast and compact longest match prefix look-up method using pointer cache for very long network address", IT Network Service Systems Laboratories Midori 3-9-1 1, Musashino, Tokyo 180-8585, Japan, 1999 IEEE.

* cited by examiner

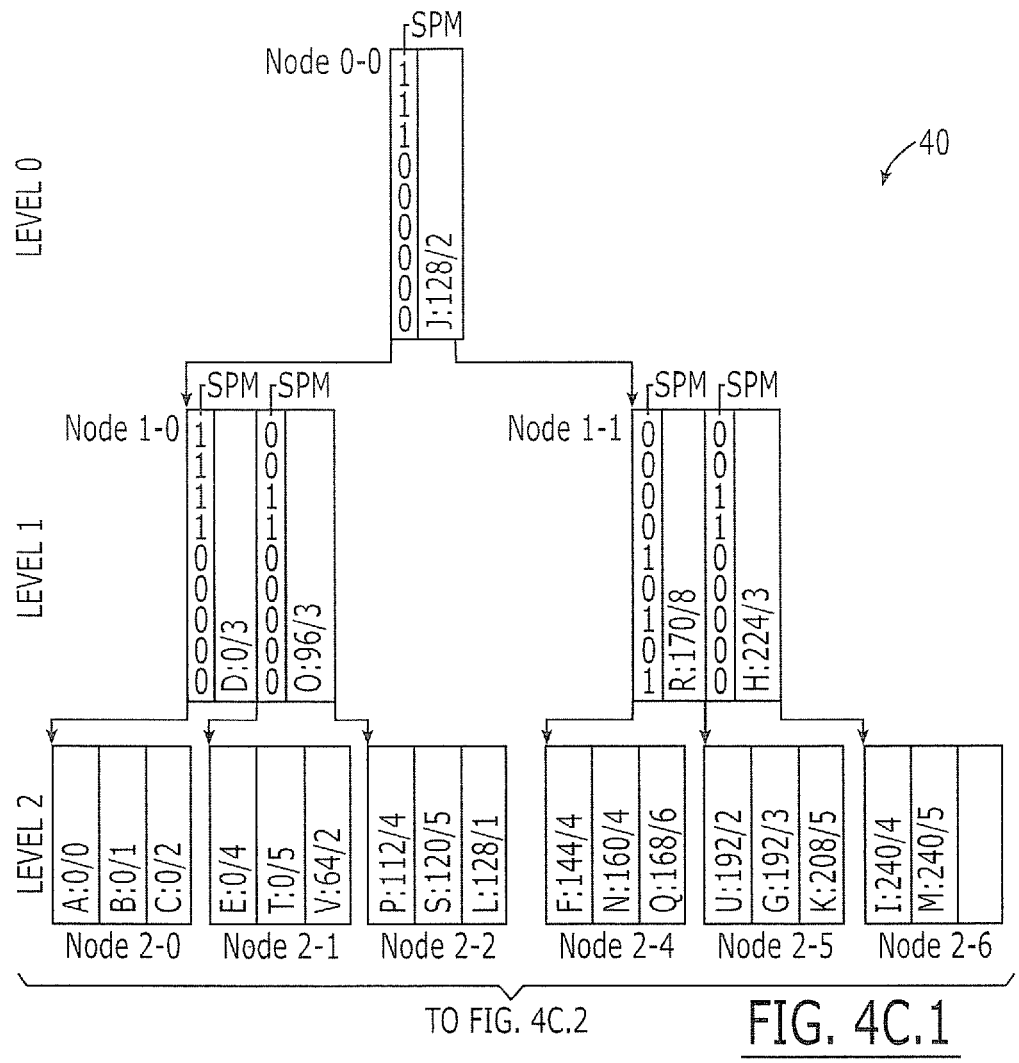
FIG. 4C.1

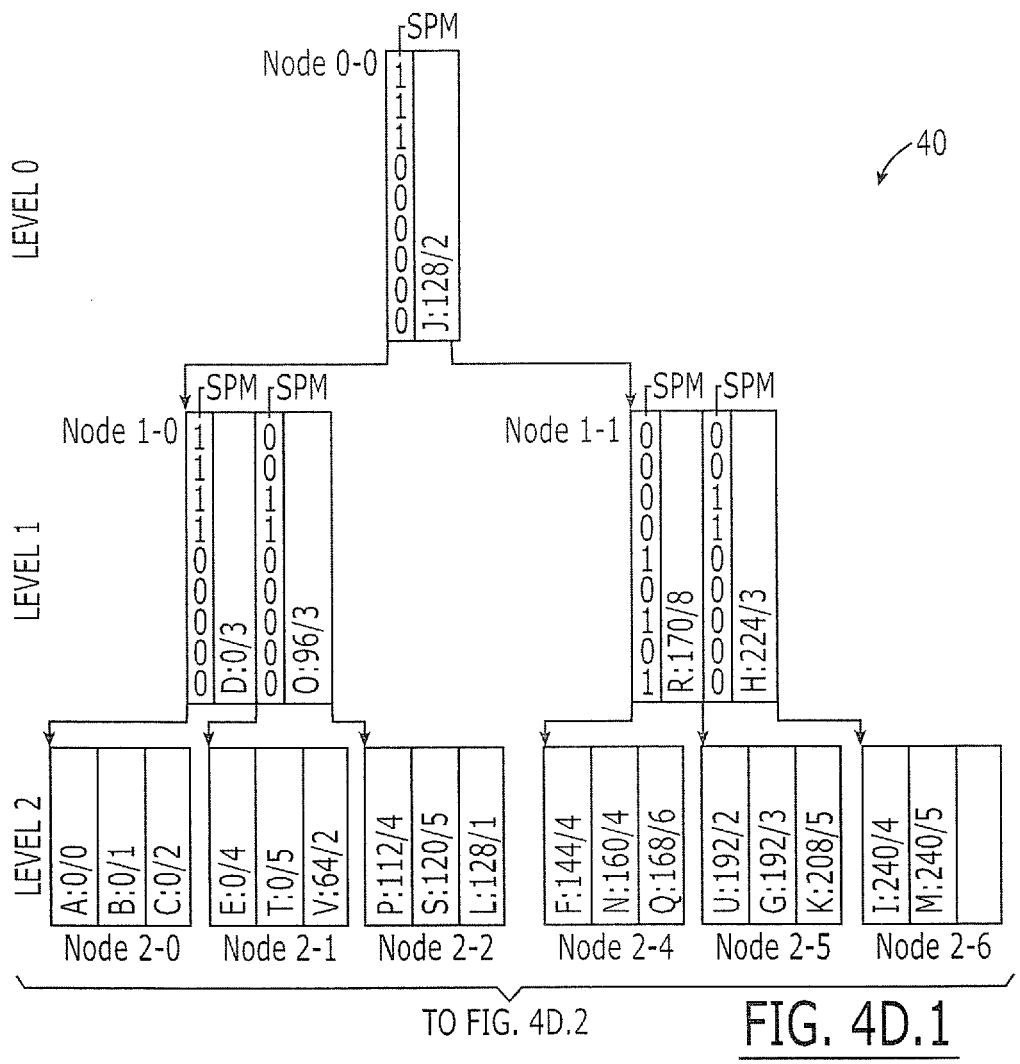
FIG. 4D.1

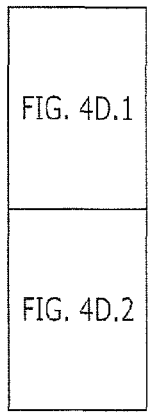
FIG. 4D.2

|                    | SEGMENT 0 | SEGMENT 1 |
|---|---|---|
| KEY BIT #          | 7 6 5 4   | 3 2 1 0   |
| SEGMENT BIT #      | 3 2 1 0   | 3 2 1 0   |
| KEY_SEG [3:0]      | 1 0 1 0   | 1 0 1 0   |
| SEG_LEN_4          | 1         | 1         |
| SPM_SEG [3:0]      | 0 0 0 1   | 0 1 0 1   |
|                    | /1 /2 /3 /4 | /5 /6 /7 /8 |

|                  | SEGMENT 0 | SEGMENT 1 |
|------------------|-----------|-----------|
| KEY BIT #        | 7 6 5 4   | 3 2 1 0   |
| SEGMENT BIT #    | 3 2 1 0   | 3 2 1 0   |
| KEY_SEG [3:0]    | 1 0 1 0   | 1 0 1 0   |
| SEG_LEN_4        | 1         | 0         |
| SPM_SEG [3:0]    | 0 0 0 1   | 0 1 1 0   |
|                  | /1 /2 /3 /4 | /5 /6 /7 /8 |

|                  | SEGMENT 0 | SEGMENT 1 |
|------------------|-----------|-----------|
| KEY BIT #        | 7 6 5 4   | 3 2 1 0   |
| SEGMENT BIT #    | 3 2 1 0   | 3 2 1 0   |
| KEY_SEG [3:0]    | 1 0 1 0   | 1 0 1 1   |
| SEG_LEN_4        | 1         | 0         |
| SPM_SEG [3:0]    | 0 0 0 1   | 0 1 1 0   |
|                  | /1 /2 /3 /4 | /5 /6 /7 /8 |

INTEGRATED SEARCH ENGINE DEVICES THAT SUPPORT LPM SEARCH OPERATIONS USING SPAN PREFIX MASKS THAT ENCODE KEY PREFIX LENGTH

REFERENCE TO PRIORITY APPLICATION

This application is a continuation-in-part (CIP) of U.S. application Ser. No. 11/184,243, filed Jul. 19, 2005, now U.S. Pat. No. 7,747,599 which claims priority to U.S. Provisional Application Ser. Nos. 60/590,500, filed Jul. 23, 2004 and 60/642,799, filed Jan. 11, 2005, the disclosures of which are hereby incorporated herein by reference.

CROSS-REFERENCE TO RELATED APPLICATIONS

This application is related to U.S. application Ser. No. 11/674,474, filed Feb. 13, 2007; Ser. No. 11/674,487, filed Feb. 12, 2007; and Ser. No. 11/184,243, filed Mar. 14, 2007, the disclosures of which are hereby incorporated herein by reference.

FIELD OF THE INVENTION

The present invention relates to integrated circuit devices and, more particularly, to integrated circuit search engine devices and methods of operating same.

BACKGROUND OF THE INVENTION

Linear sorting techniques may be utilized to arrange a plurality of search prefixes (a/k/a search "keys") within an integrated circuit search engine device. One such linear sorting technique is based on the starting address of a prefix range associated with each search prefix. In the event a plurality of the search prefixes have the same starting address but different prefix lengths, then a search prefix with a shorter prefix length may be treated as being "less than" a search prefix with a longer prefix length. One example of a plurality of 8-bit search prefixes is illustrated by TABLE 1.

The search prefixes in TABLE 1 may be sorted linearly by prefix value and prefix length as shown in FIG. 1, with the smallest search prefix (e.g., A:0/0) located on the left side of the array 10 and the largest search prefix (e.g., M:240/5) located on the right side on the array 10. To perform a linear search (i.e., lookup) operation, an applied search key is compared with every search prefix in the array 10, starting with the search prefix on the left side of the array 10, until a search prefix is found with a start address that is greater than the applied search key. Each search prefix in the array 10 that matches the applied search key is a potential longest prefix match. Once the search operation terminates at the right side of the array 10 (or at a search prefix with a start address than is greater than the applied search key), the rightmost search prefix that matches the search key is treated as the longest prefix match (LPM).

TABLE 1

| ID | KEY | ID | KEY | ID | KEY |
|---|---|---|---|---|---|
| A | 0/0 | I | 240/4 | Q | 168/6 |
| B | 0/1 | J | 128/2 | R | 170/8 |
| C | 0/2 | K | 208/5 | S | 120/5 |
| D | 0/3 | L | 128/1 | T | 0/5 |
| E | 0/4 | M | 248/5 | U | 192/2 |
| F | 144/4 | N | 160/4 | V | 64/2 |

TABLE 1-continued

| ID | KEY | ID | KEY | ID | KEY |
|---|---|---|---|---|---|
| G | 192/3 | O | 96/3 | | |
| H | 224/3 | P | 112/4 | | |

This search operation is an iterative process, with each search prefix being compared in sequence with the applied search key. As illustrated by FIG. 2, this process can also be implemented in a hardware-based array 20, by simultaneously comparing the applied search key (e.g., 171) to all of the search prefixes within the array 20, using a plurality of comparators 22 that generate match and non-match signals. In particular, each match between the applied search key and a search prefix results in the generation of a match signal (M) and each non-match results in the generation of a "less than" signal (LT) or a "greater than" signal (GT). The comparators 22 may generate these signals as two-bit binary signals (e.g., M=11b, LT=01b, and GT=10b). The longest prefix match is represented by the search prefix associated with the rightmost match signal M, which in FIG. 2 is represented by the search prefix Q:168/2. This longest prefix match may be identified using a priority encoder (not shown) that is configured to receive the signals generated by the comparators 22.

Conventional network routing applications may also utilize tree data structures to support search operations within an integrated circuit device. These tree data structures may include b-tree structures that are kept balanced to prevent one or more branches of the tree from becoming longer that other branches of the tree and thereby increasing search latency. FIG. 3 illustrates a three-level b-tree data structure 30 containing the search prefixes of TABLE 1 and the array 20 of FIG. 2. This b-tree 30 is illustrated as including six leaf nodes at Level 2 (i.e., Nodes 2-0, 2-1, 2-2, 2-4, 2-5 and 2-6), two leaf nodes at Level 1 (Node 1-0 and 1-1) and a root node at Level 0 (Node 0-0).

As illustrated by the highlighted search path, a search of the b-tree using 171 as an applied search key begins at Node 0-0. The search prefix J at Node 0-0 represents a match with the search key 171 because 171 (i.e., 10101011b) is a match with 128/2 (i.e., 10XXXXXX), where X represents a "don't-care" value. The search then proceeds to Node 1-1 (i.e., along a right-side branch from Node 0-0 to Node 1-1) because 171 is greater than 128. No matches are present at Node 1-1 because the search key 171 (i.e., 10101011b) does not match either the search prefix R: 170/8 (10101010b) or the search prefix H:224/3 (i.e., 111XXXXX). Because the search key 171 is greater than 170 and less than 224, the search then proceeds to and terminates at Node 2-5, which is a leaf node of the b-tree 30. None of the search prefixes U:192/2, G:192/3 or K:208/5 at Node 2-5 represent a match with the search key 171. Thus, based on the illustrated search path, which traverses Nodes 0-0, 1-1 and 2-5 of the b-tree 30, only search prefix J:128/2 represents a matching entry within the search key 171. However, as illustrated best by FIG. 2, the search prefix Q:168/6, which resides at Node 2-4 of FIG. 3, actually represents the longest prefix match with the search key 171, yet this search prefix was not within the search path and was not detected during the search operation. Moreover, the search prefixes A:0/0, L:128/1 and N:160/4 also represent matches that were not within the search path. This means that the conventional sorting of prefixes within the b-tree 30 of FIG. 3 will not yield correct results for all applied search keys.

Another example of a b-tree data structure is described in U.S. Pat. No. 6,490,592, which is assigned to Nortel Networks Limited. As described at Col. 1 of the '592 patent, conventional b-tree data structures may not be well suited for search operations that require identification of longest prefix matches (LPMs) within the b-tree data structure. To address this limitation, the '592 patent describes a modified b-tree data structure that is arranged so that data elements stored therein, which have no overlapping prefixes are arranged in a standard b-tree structure. However, other data elements that have overlapping prefixes are arranged in a modified structure so that the prefix of such a data element contains the prefixes of all such data elements that succeed it in the b-tree. This modified structure is referred to as an L-structure. FIG. 3 of the '592 patent shows portions 300 and 340 that include a b-tree into which an L-structure 320 is inserted. Unfortunately, the use of L-structures within a b-tree may represent a form of prefix nesting that reduces a likelihood of achieving ideal b-tree properties that typically reduce search latency and result in efficient utilization of memory space. In particular, for a fixed memory capacity and latency, which is related to tree height, the number of search prefixes that can be supported within the b-tree of the '592 patent is statistically dependent on the degree of nesting within the prefix data set supported by the b-tree. Accordingly, prefix data sets that require a high degree of nesting may result in an inefficient utilization of the memory space that is required to maintain the b-tree.

SUMMARY OF THE INVENTION

A search engine device according to some embodiments of the present invention includes a hierarchical memory that is configured to store a multi-way tree of search prefixes and span prefix masks (SPMs) therein. Some of these SPMs are evaluated during each search operation. SPMs serve to identify search prefixes that match an applied search key, yet reside at nodes of the multi-way tree that are not traversed during the search operation (e.g., lie lower and left of the search path). Such matches are typically referred to as longest prefix matches (LPMs). The search engine device also includes handle memory. This handle memory may be configured to support a respective handle memory block for each search prefix within each of a plurality of nodes of the b-tree that reside above a leaf level of the multi-way tree. Each of these handle memory blocks may have sufficient capacity to support one result handle per bit within a span prefix mask associated with a corresponding search prefix. In other cases, each of these handle memory blocks may have sufficient capacity to support only M+1 handles, where M is a positive integer corresponding to a quantity of search prefixes supported by each of a plurality of leaf nodes within the b-tree.

An additional embodiment of the present invention includes a pipelined search engine device having at least one storage device therein. This storage device is configured to support a tree data structure having at least a first search prefix and at least a first span prefix mask therein that supports LPM operations. This first span prefix mask has a value that encodes an identity of at least a second search prefix in the tree data structure that is a prefix match to the first search prefix. This encoding of the identity is based on positions of "set" bits within the first span prefix mask.

Methods of searching a tree of search prefixes within a hierarchical memory are also provided. These methods include evaluating span prefix masks (SPMs) associated with each of a plurality of search prefixes located at first nodes within the tree during a search operation. This evaluating step is performed to identify search prefixes that match an applied search key yet reside at nodes of the tree that are not traversed during the search operation. In this manner, search prefixes that represent longest prefix matches (LPMs) can be identified in situations where a conventional search operation would not correctly detect a longest prefix match (LPM). These search prefix masks may be configured so that each bit of the mask that has been set operates to identify a respective search prefix within the tree. In particular, each bit of a first one of the span prefix masks that has been set identifies a respective search prefix within the tree having a value that is less than a value of the search prefix to which the first one of the span prefix masks corresponds.

According to additional embodiments of the invention, an integrated circuit device includes a pipelined search engine that supports a tree of search prefixes. This tree of search prefixes utilizes span prefix masks to assist longest prefix match (LPM) detection when the tree is searched. Each span prefix mask is configured to encode values of other search prefixes in the tree that represent prefix matches to the search prefix to which the span prefix mask is associated. Based on this configuration, the span prefix masks enable the pipelined search engine to detect a match between a search prefix applied to the pipelined search engine during a search operation and a search prefix located in a portion of the tree that is not traversed during the search operation.

Still further embodiments of the present invention include a pipelined search engine that is configured to support a tree of search keys therein that utilizes span prefix masks to assist in longest prefix match (LPM) detection when the tree is searched. Each of the plurality of span prefix masks encodes a prefix length of a search key to which the span prefix mask is associated and also encodes a value of another search key in the tree that is a prefix match to the search key to which the span prefix mask is associated. In the event a tree of search keys is configured to support multi-segment search keys, then the tree may also be configured to utilize a segment length indicator for each of a plurality of segments of a multi-segment search key. Each segment length indicator identifies whether or not a corresponding segment of the multi-segment search key is a fully specified segment.

Methods of encoding a prefix length of a search key to be inserted into a multi-way tree are also provided. These methods include generating a span prefix mask for a corresponding search key. This span prefix mask is configured to encode a prefix length of the search key and also encode value of at least another search key in the multi-way tree that is a prefix match to the search key. Additional methods may include encoding a multi-segment search key within a multi-way tree of search keys. In particular, these methods include generating a multi-segment span prefix mask associated with a multi-segment search key. Each mask is configured to encode a value of at least another multi-segment search key in the multi-way tree that is a prefix match to the multi-segment search key. These methods also include generating a segment length indicator for at least one of the segments of the multi-segment search key that identifies whether or not the corresponding segment of the multi-segment search key is a fully specified segment. The step of generating a multi-segment span prefix mask may also include generating the mask so that encodes a prefix length of the corresponding multi-segment search key.

BRIEF DESCRIPTION OF THE DRAWINGS

FIG. 4C illustrates the three-level b-tree data structure of FIG. 4A along with a diagram that illustrates an allocation of handle memory to support the corresponding b-tree data structure.

FIG. 4D illustrates the three-level b-tree data structure of FIG. 4A along with a diagram that illustrates an alternative allocation of handle memory to support the corresponding b-tree data structure when M<W, where M is a positive integer that represents a maximum number of search prefixes within a leaf node of the b-tree and W is a positive integer that represents a width of the search prefixes.

FIGS. 7A-7C illustrate alternative techniques to encode multi-segment search keys in a search engine that supports LPM search operations.

DESCRIPTION OF PREFERRED EMBODIMENTS

Figures 1, 2:
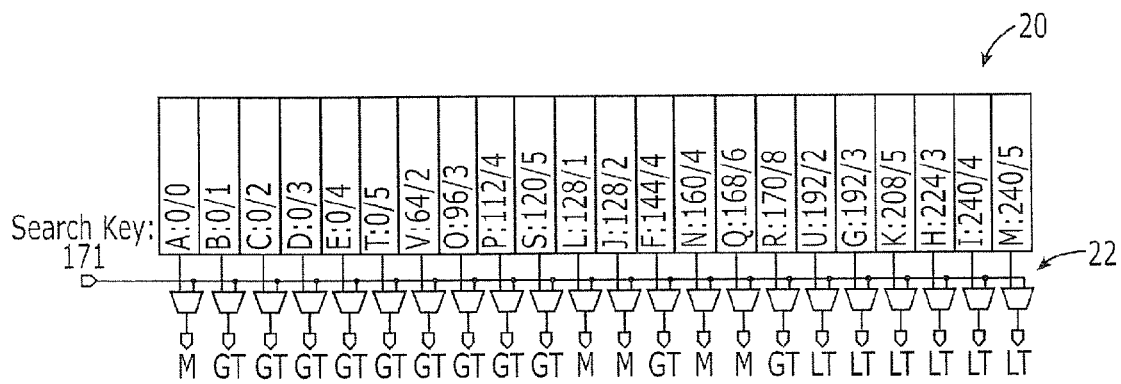
FIG. 1 illustrates a plurality of 8-bit search prefixes of varying prefix length that are sorted linearly based on prefix value (address) and prefix length, according to the prior ail.
FIG. 2 illustrates a conventional hardware-based array of search prefixes that supports parallel search operations.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout. Moreover, the phrase "communicatively coupled" includes both direct and indirect forms of electrical coupling and the term "key" may be used as a shorthand notation for the more general term "prefix", including both fully specified prefixes and non-fully specified prefixes.

Figure 4A:
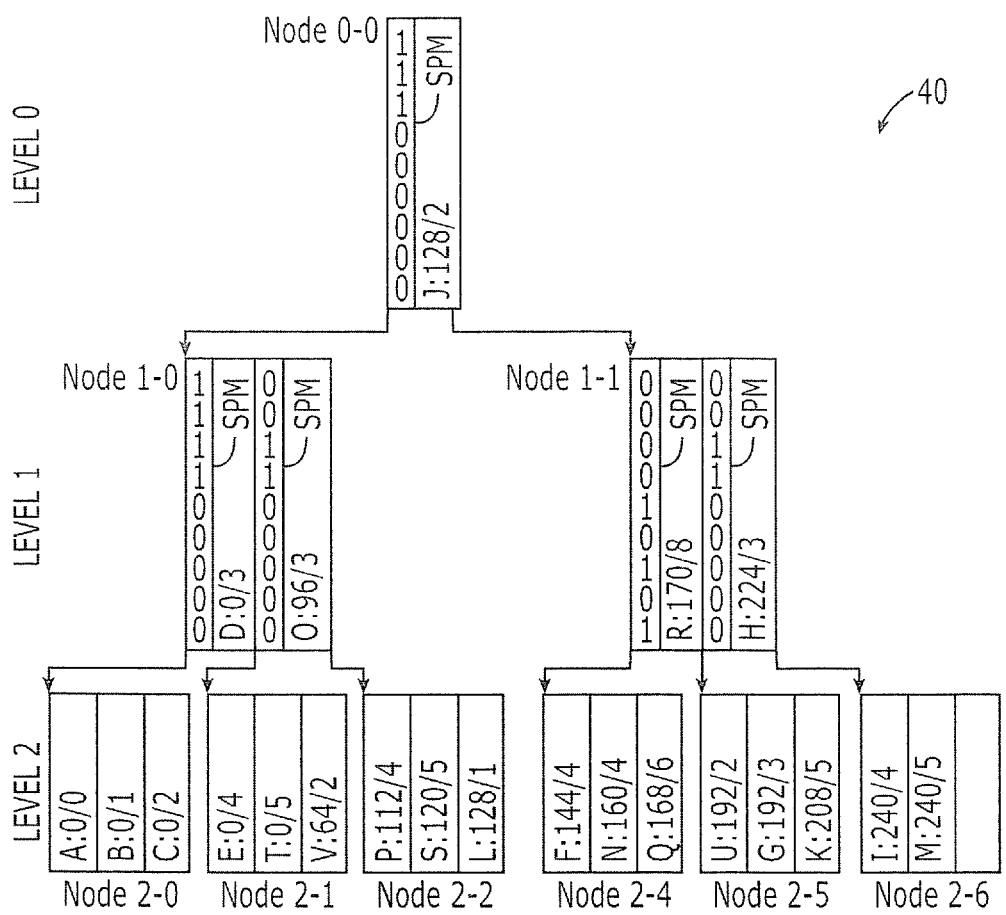
FIG. 4A illustrates a three-level b-tree data structure that contains search prefixes and span prefix masks (SPMs) according to an embodiment of the present invention.

FIG. 4A illustrates a b-tree 40 that contains search prefixes and span prefix masks (SPMs) according to embodiments of the present invention, which may be embodied within a hardware search engine device containing a hierarchical memory. The b-tree 40 includes a root node (Node 0-0) at Level 0, two nodes (Node 1-0 and 1-1) at Level 1 and six nodes (Node 2-0, 2-1, 2-2, 2-4, 2-5 and 2-6) at Level 2. The six nodes at Level 2 represent leaf nodes. Each leaf node is configured to support a maximum of three search prefixes. The two nodes at Level 1 represent nodes at the leaf parent level (i.e., one level above the leaf nodes). Each of the nodes at Level 1 contains two search prefixes and two span prefix masks. The root node contains one search prefix and one span prefix mask. These span prefix masks (SPMs) supplement the b-tree 40 to ensure that all matches for an applied search key, including a longest prefix match, are found in response to a search operation. Each span prefix mask may contain W+1 mask bits in the form of a mask vector, where W is a positive integer that represents a width of the search prefixes in the b-tree 40. For purposes of illustration only, these search prefixes are illustrated as having a width W of eight (8) bits, however, most applications require the use of search prefixes that are substantially wider that those illustrated herein. Each span prefix mask associated with a respective search prefix in a non-leaf node identifies the search prefix itself and all shorter prefixes of the search prefix that are located below and to the left of the search prefix in the b-tree 40. Thus, the span prefix mask for the search prefix J:128/2, for example, is configured to identify the search prefix J:128/2 and the shorter prefixes L:128/1 and A:0/0, which are located at leaf nodes 2-0 and 2-2, respectively. The search prefixes at the leaf nodes do not require span prefix masks because these prefixes are located at terminal nodes of the b-tree 40 and no shorter prefixes exist at any lower level of the b-tree 40.

To derive bits 0 through 8 of the 9-bit SPM corresponding to search prefix J:128/2 at node 0-0, bit-by-bit AND operations may be performed between the search prefix J and the nine 8-bit vectors illustrated by TABLE 2. Performing these AND operations results in the identification of search prefixes A:0/0, L:128/1 and J:128/2, which means the span prefix mask corresponding to search prefix J:128/2 within the b-tree 40 equals: SPM[0:8]=111000000.

TABLE 2

| SPM LENGTH | SEARCH VECTOR | PREFIX | "AND" RESULT | IS RESULT EQUAL TO SEARCH PREFIX OR SHORTER PREFIX WITHIN LEFT SUB-TREE | SPM VALUE |
|---|---|---|---|---|---|
| /0 | 00000000 | 128 = 10000000 | 0/0 = A | YES | SPM[0] = 1 |
| /1 | 10000000 | 128 = 10000000 | 128/1 = L | YES | SPM[1] = 1 |
| /2 | 11000000 | 128 = 10000000 | 128/2 = J | YES | SPM[2] = 1 |
| /3 | 11100000 | 128 = 10000000 | 128/3 | NO | SPM[3] = 0 |
| /4 | 11110000 | 128 = 10000000 | 128/4 | NO | SPM[4] = 0 |
| /5 | 11111000 | 128 = 10000000 | 128/5 | NO | SPM[5] = 0 |
| /6 | 11111100 | 128 = 10000000 | 128/6 | NO | SPM[6] = 0 |
| /7 | 11111110 | 128 = 10000000 | 128/7 | NO | SPM[7] = 0 |
| /8 | 11111111 | 128 = 10000000 | 128/8 | NO | SPM[8] = 0 |

To derive bits 0 through 8 of the 9-bit SPM corresponding to search prefix D:0/3 at node 1-0, bit-by-bit AND operations may be performed between the search prefix D and the nine 8-bit vectors illustrated by TABLE 3. Performing these AND operations results in the identification of search prefixes A:0/

0, B:0/1, C:0/2 and D:0/3, which means the span prefix mask corresponding to search prefix D:0/3 within the b-tree 40 equals: SPM[0:8]=111100000.

TABLE 3

| SPM LENGTH | VECTOR | SEARCH PREFIX | "AND" RESULT | IS RESULT EQUAL TO SEARCH PREFIX OR SHORTER PREFIX WITHIN LEFT SUB-TREE | SPM VALUE |
|---|---|---|---|---|---|
| /0 | 00000000 | 0 = 00000000 | 0/0 = A | YES | SPM[0] = 1 |
| /1 | 10000000 | 0 = 00000000 | 0/1 = B | YES | SPM[1] = 1 |
| /2 | 11000000 | 0 = 00000000 | 0/2 = C | YES | SPM[2] = 1 |
| /3 | 11100000 | 0 = 00000000 | 0/3 = D | YES | SPM[3] = 1 |
| /4 | 11110000 | 0 = 00000000 | 0/4 | NO | SPM[4] = 0 |
| /5 | 11111000 | 0 = 00000000 | 0/5 | NO | SPM[5] = 0 |
| /6 | 11111100 | 0 = 00000000 | 0/6 | NO | SPM[6] = 0 |
| /7 | 11111110 | 0 = 00000000 | 0/7 | NO | SPM[7] = 0 |
| /8 | 11111111 | 0 = 00000000 | 0/8 | NO | SPM[8] = 0 |

To derive bits 0 through 8 of the 9-bit SPM corresponding to search prefix O:96/3 at node 1-0, bit-by-bit AND operations may be performed between the search prefix O and the nine 8-bit vectors illustrated by TABLE 4. Performing these AND operations results in the identification of search prefixes V:64/2 and O:96/3, which means the span prefix mask corresponding to search prefix O:96/3 within the b-tree 40 equals: SPM[0:8]=001100000.

TABLE 4

| SPM LENGTH | VECTOR | SEARCH PREFIX | "AND" RESULT | IS RESULT EQUAL TO SEARCH PREFIX OR SHORTER PREFIX WITHIN LEFT SUB-TREE | SPM VALUE |
|---|---|---|---|---|---|
| /0 | 00000000 | 96 = 01100000 | 0/0 | NO | SPM[0] = 0 |
| /1 | 10000000 | 96 = 01100000 | 0/1 | NO | SPM[1] = 0 |
| /2 | 11000000 | 96 = 01100000 | 64/2 = V | YES | SPM[2] = 1 |
| /3 | 11100000 | 96 = 01100000 | 96/3 = O | YES | SPM[3] = 1 |
| /4 | 11110000 | 96 = 01100000 | 96/4 | NO | SPM[4] = 0 |
| /5 | 11111000 | 96 = 01100000 | 96/5 | NO | SPM[5] = 0 |
| /6 | 11111100 | 96 = 01100000 | 96/6 | NO | SPM[6] = 0 |
| /7 | 11111110 | 96 = 01100000 | 96/7 | NO | SPM[7] = 0 |
| /8 | 11111111 | 96 = 01100000 | 96/8 | NO | SPM[8] = 0 |

To derive bits 0 through 8 of the 9-bit SPM corresponding to search prefix R:170/8 at node 1-1, bit-by-bit AND operations may be performed between the search prefix R and the nine 8-bit vectors illustrated by TABLE 5. Performing these AND operations results in the identification of search prefixes N:160/4, Q:168/6 and R:170/8, which means the span prefix mask corresponding to search prefix R:170/8 within the b-tree 40 equals: SPM[0:8]=000010101.

TABLE 5

| SPM LENGTH | VECTOR | SEARCH PREFIX | "AND" RESULT | IS RESULT EQUAL TO SEARCH PREFIX OR SHORTER PREFIX WITHIN LEFT SUB-TREE | SPM VALUE |
|---|---|---|---|---|---|
| /0 | 00000000 | 170 = 10101010 | 0/0 | NO | SPM[0] = 0 |
| /1 | 10000000 | 170 = 10101010 | 128/1 | NO | SPM[1] = 0 |
| /2 | 11000000 | 170 = 10101010 | 128/2 | NO | SPM[2] = 0 |
| /3 | 11100000 | 170 = 10101010 | 160/3 | NO | SPM[3] = 0 |
| /4 | 11110000 | 170 = 10101010 | 160/4 = N | YES | SPM[4] = 1 |
| /5 | 11111000 | 170 = 10101010 | 168/5 | NO | SPM[5] = 0 |
| /6 | 11111100 | 170 = 10101010 | 168/6 = Q | YES | SPM[6] = 1 |

TABLE 5-continued

| SPM LENGTH | SEARCH VECTOR | SEARCH PREFIX | "AND" RESULT | IS RESULT EQUAL TO SEARCH PREFIX OR SHORTER PREFIX WITHIN LEFT SUB-TREE | SPM VALUE |
|---|---|---|---|---|---|
| /7 | 11111110 | 170 = 10101010 | 170/7 | NO | SPM[7] = 0 |
| /8 | 11111111 | 170 = 10101010 | 170/8 = R | YES | SPM[8] = 1 |

To derive bits 0 through 8 of the 9-bit SPM corresponding to search prefix H:224/3 at node 1-1, bit-by-bit AND operations may be performed between the search prefix H and the nine 8-bit vectors illustrated by TABLE 6. Performing these AND operations results in the identification of search prefixes U:192/3 and H:224/3, which means the span prefix mask corresponding to search prefix H:224/8 within the b-tree 40 equals: SPM[0:8]=001100000.

TABLE 6

| SPM LENGTH | SEARCH VECTOR | SEARCH PREFIX | "AND" RESULT | IS RESULT EQUAL TO SEARCH PREFIX OR SHORTER PREFIX WITHIN LEFT SUB-TREE | SPM VALUE |
|---|---|---|---|---|---|
| /0 | 00000000 | 224 = 11100000 | 0/0 | NO | SPM[0] = 0 |
| /1 | 10000000 | 224 = 11100000 | 128/1 | NO | SPM[1] = 0 |
| /2 | 11000000 | 224 = 11100000 | 192/2 = U | YES | SPM[2] = 1 |
| /3 | 11100000 | 224 = 11100000 | 224/3 = H | YES | SPM[3] = 1 |
| /4 | 11110000 | 224 = 11100000 | 224/4 | NO | SPM[4] = 0 |
| /5 | 11111000 | 224 = 11100000 | 224/5 | NO | SPM[5] = 0 |
| /6 | 11111100 | 224 = 11100000 | 224/6 | NO | SPM[6] = 0 |
| /7 | 11111110 | 224 = 11100000 | 224/7 | NO | SPM[7] = 0 |
| /8 | 11111111 | 224 = 11100000 | 224/8 | NO | SPM[8] = 0 |

As illustrated by TABLES 2-6, the bit corresponding to the longest prefix that is set within a span prefix mask represents the search prefix associated with the span prefix mask. For example, as illustrated by TABLE 2, the /2 bit of the span prefix mask associated with the search prefix J:128/2 in node 0-0 corresponds to J:128/2 itself. As will be understood by those skilled in the art, the search prefix associated with a span prefix mask can always be inferred, but it is preferable in hardware and software implementations of the search operations described herein to set the span prefix mask bit corresponding to the search prefix. For some implementations, the setting of this bit can also result in an efficient way of encoding the length of the search prefix based on the bit position of the longest prefix bit of the span prefix mask that is set for the search prefix. This can save a bit within $\log_2 W$ bits per search prefix, depending on how an implementation operates to encode the prefix length.

Fortunately, each search prefix need only be represented once per level of the b-tree 40 to a guarantee a first pass search success for all possible search keys. Moreover, the set bits within each span prefix mask for a corresponding search prefix need only account for shorter prefixes that are located within a left sub-tree of the corresponding search prefix. For example, the search prefix A:0/0, which is the leftmost search prefix within the leftmost leaf node 2-0, is represented by the least significant bit of the span prefix mask associated with the search prefix J at the root node 0-0 and the least significant bit of the span prefix mask associated with the search prefix D within node 1-0.

Figure 3:
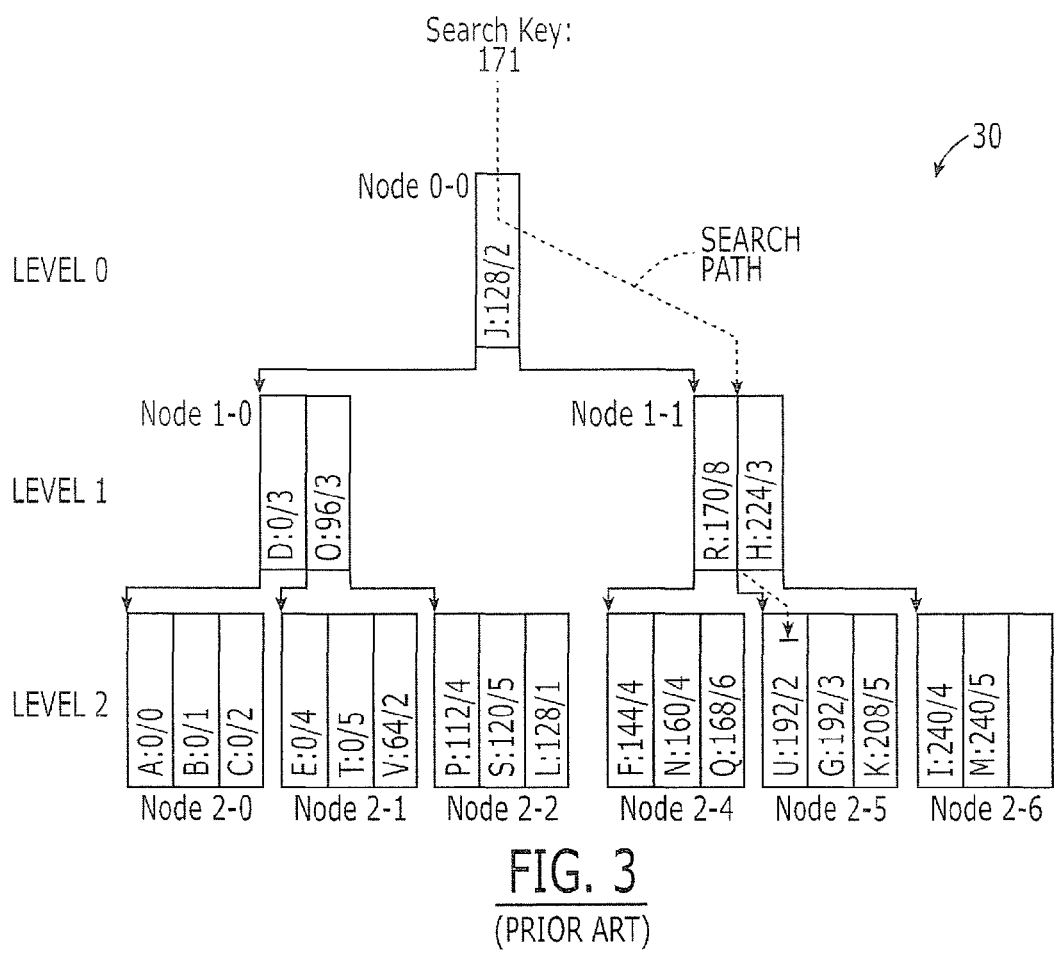
FIG. 3 illustrates a conventional three-level b-tree data structure containing the search prefixes illustrated by FIGS. 1 and 2.

As described previously with respect to FIG. 3, a search of the b-tree 30 in FIG. 3 failed using 171 as a search key because the search prefix Q:168/6, which is the longest prefix match to the search key 171, was not encountered during the search operation. However, the performance of a corresponding search in the b-tree 40 of FIG. 4B results in the correct detection of search prefix Q:168/6 as the longest prefix match to the search key 171. As illustrated by the breakout box to the right of node 0-0 and TABLE 2, a traversal of the search prefix J:128/2 at node 0-0 (and corresponding SPM) results in the identification of three (3) matching search prefixes within the b-tree 40. These matching search prefixes include: A:0/0, L:128/1 and J:128/2, with the search prefix J:128/2 being the longest prefix match to the search key 171 at Level 0 of the search operation. The identification of search prefixes A:0/0 and L:128/1, which are located outside the search path associated with the applied search key 171, represents a type of "lookahead" search to Levels 1 and 2 of the b-tree 30.

Because the search key 171 is greater than 128, the next stage of the search at Level 1 passes down and to the right of node 0-0 to node 1-1. At node 1-1, it is apparent that the search key 171 is greater than the search prefix R:170/8 and less than the search prefix H:224/3, which means the next stage of the search operation at Level 2 passes to node 2-5, which contains no matching search prefixes. Here, the breakout box to the right of node 1-1 shows that the span prefix mask associated with the search prefix R:170/8 identifies three search prefixes (N:160/4, Q:168/6 and R:170/8) as being within the b-tree 40 even though the search path passes to the right of the search prefix R and does not encounter leaf node 2-4 of the b-tree 40, which contains the additional matching search prefixes of N:160/4 and O:168/6. These three search prefixes are identified by ANDing the vectors 11110000 (corresponding to SPM /4), 11111100 (corresponding to SPM /6) and 11111111 (corresponding to SPM /8) with 170, which is represented in binary format as 10101010b. This ANDing operation is illustrated more fully by TABLE 5. Of the identified search prefixes N:160/4, Q:168/6 and R:170/8 within the breakout box to the right of node 1-1, search prefix Q:168/6 represents a longest prefix match to the applied search key 171. Thus, even though the search prefix Q:168/6 is not within the search path that extends from node 0-0 to node 1-1 and then terminates at node 2-5, it is properly identified as a longest prefix match with the aid of the SPMs. In this manner, the SPM associated with search prefix R:170/8 supports a "lookahead" search operation to node 2-4, which is outside the search path associated with the applied search key 171.

Search operations within a search engine device according to some embodiments of the invention result not only in the detection of a longest prefix match within a database of entries (e.g., a hierarchical memory containing a multi-level b-tree), but also in the generation of result data, which is typically provided to a command host responsible for issuing search and other instructions to the search engine device. This result data, which is referred to herein as "handles," may be maintained within handle memory associated with the search engine device.

One approach to updating a hierarchical memory that supports a b-tree in accordance with FIG. 4A includes representing a handle associated with a search prefix at multiple levels within the b-tree. This incurs the cost of additional handle memory, but allows for highly efficient updates to the hierarchical memory. A requirement that each handle associated with a search prefix be stored up to once for each level of the b-tree can result in the total handle memory size being much greater than the amount of memory needed for one handle times the maximum number of search prefixes supported by the b-tree. However, because it is typically difficult to predict or tightly control a distribution of search prefixes and their corresponding handles within a b-tree, an efficient way to reduce handle memory is by tailoring the shape of a b-tree to minimize handle memory usage. Here, the worst case for handle memory usage is to provide storage for one handle per each bit of each SPM in each node above the leaf level and one handle for each search prefix in each leaf node.

FIG. 4C illustrates the three-level b-tree 40 of FIG. 4A along with a diagram that illustrates an allocation of a dedicated handle memory 42 to support the b-tree 40. This handle memory 42 includes one handle memory block for each leaf node at Level 2 of the b-tree 40 and one handle memory block for each search prefix at the leaf parent level and higher levels (e.g., Levels 0 and 1) of the b-tree 40. Each handle memory block at the leaf parent level and higher level(s) provides sufficient storage for one handle per bit of the span prefix mask associated with the corresponding search prefix. Accordingly, as illustrated at FIG. 4C, a maximum of nine (9) handles (i.e., W+1 handles) may be stored in a handle memory block associated with the search prefix at the root node (i.e., node 0-0) of the b-tree 40, with the number of valid handles in the handle memory block being equivalent to the number of bits set within the corresponding span prefix mask. Each of the handle memory blocks at the leaf parent level is also configured to store as many as nine (9) handles. Fortunately, each handle memory block at the leaf level, which contains most of the search prefixes within the b-tree, only needs sufficient capacity to store one handle per search prefix within a node at the leaf level. Each handle memory block at the leaf level can be indexed based on the search prefix position of the longest matching prefix within the leaf node at which a search terminated. Moreover, it is only necessary to perform one read operation on the dedicated handle memory 42 per search. Thus, there is no need to perform one read operation on the handle memory for each level of the tree as there is when performing a search operation on a hierarchical memory containing the b-tree.

In the search example described above with respect to FIG. 4B, the longest matching prefix was shown to be Q:168/6. The search prefix Q was not found by traversing the node where search prefix Q was located within the b-tree 40, but was instead based on the /6 bit being set in the SPM associated with search prefix R:170/8 at node 1-1, key 0. Indexing the handle memory 42 in FIG. 4C using the position of search prefix R as the reference, identifies a sub-block of handles with valid handles. These valid handles are represented by the handle words corresponding to the /4, /6 and /8 bits of the corresponding SPM. Reading the location in handle memory 42 associated with the /6 bit returns "Handle Q" which is the correct handle for the longest matching prefix Q:168/6.

As illustrated by FIG. 4D, it is possible to save some handle storage space at the leaf parent level within the b-tree for those cases where M<W within the b-tree (i.e., where the number M of search prefixes within each leaf node (e.g., 3) is less than the width of the search prefixes in the b-tree (e.g., 8)). In this special case, instead of needing handle storage space for W+1 (e.g., 9) handles per search prefix, it is only necessary to store M+1 (e.g., 4) handles per search prefix at the leaf parent level. This reduced capacity handle memory 42' is illustrated at FIG. 4D.2. This special case scenario may also be applied to any non-leaf level where the capacity (i.e., number of search prefixes) of all sub-trees to the non-leaf level is less than W.

Figure 5A:
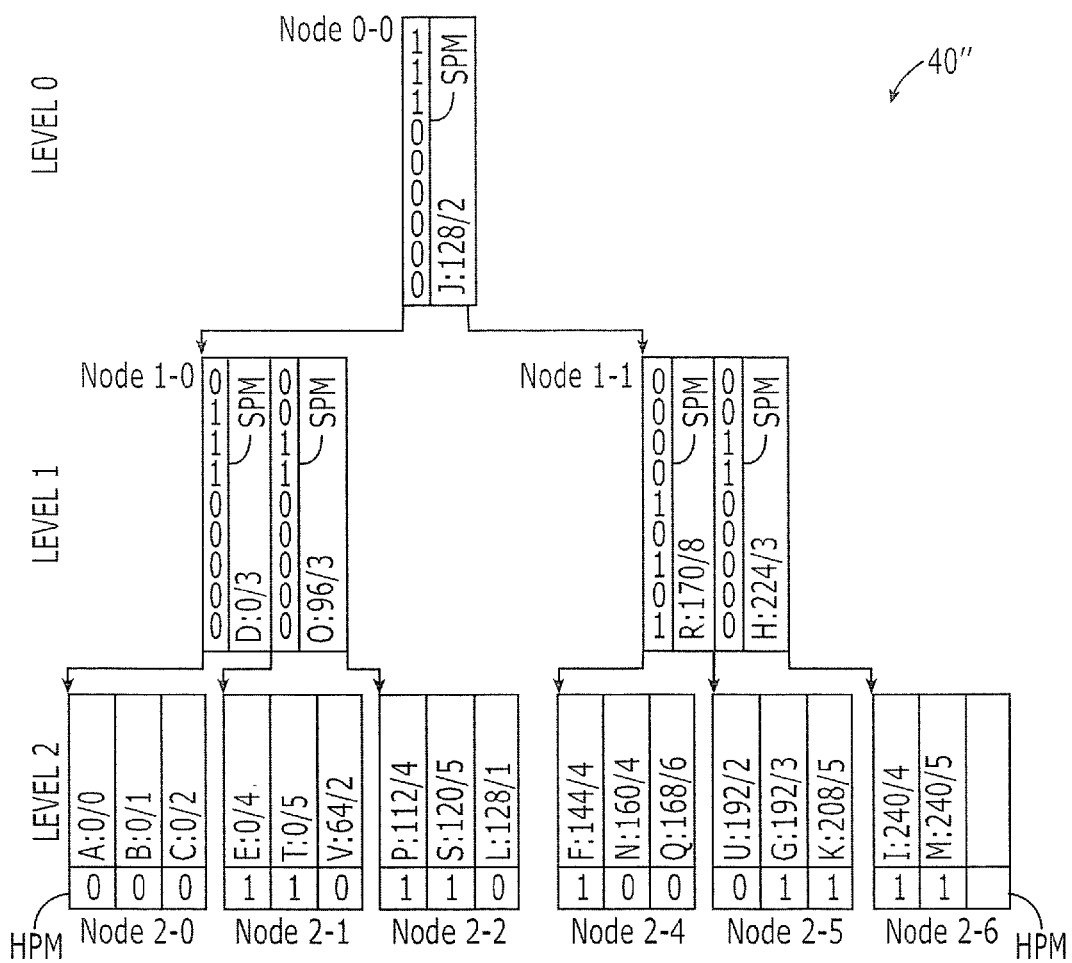
FIG. 5A illustrates a three-level b-tree data structure that contains search prefixes and span prefix masks (SPMs) according to another embodiment of the present invention.

A three-level b-tree data structure 40" that contains search prefixes and span prefix masks (SPMs) according to another embodiment of the present invention is illustrated by FIG. 5A. This b-tree data structure 40" is similar to the b-tree 40 of FIG. 4A, however, three differences are present. The first difference can be understood by evaluating, for example, the span prefix masks (SPMs) associated with the search prefix J at the root node (node 0-0) and the search prefix D at node 1-0, in FIG. 5A. At the root node, the /0 bit of the SPM (i.e., SPM[0]) associated with the search prefix J is set to "1" to thereby reflect the presence of search prefix A at a lower leaf node (i.e., node 2-0). The setting of this bit is consistent with the results illustrated by TABLE 2. However, at node 1-0, the /0 bit of the SPM associated with the search prefix D is held at "0" to thereby remove any identification of the search prefix A at the leaf node 2-0, because it has already been identified by the SPM associated with search prefix J at a higher level within the b-tree 40". Thus, in FIG. 5A, a search prefix is reflected only once in an SPM, and then only at the highest level that it can be represented within the b-tree 40".

The second and third differences are present because it is necessary to know if a handle (i.e., result) associated with a search prefix is stored in memory associated with a location of the search prefix within the b-tree or associated with an SPM bit being set to represent the search prefix at a higher level within the b-tree. In particular, the second difference involves setting a corresponding bit in an SPM to represent the SPM's search prefix only if that search prefix is not identified in another SPM at a higher level within the b-tree. For example, the /2 bit of the SPM corresponding to search prefix J is set to "1" to thereby reflect the search prefix J, and the /3 bits of the SPMs corresponding to the search prefixes D, O and H at nodes 1-0 and 1-1 are all set to "1" because none of these search prefixes are identified in the SPM corresponding to the search prefix J at a higher level in the b-tree 40". However, if the search prefix D, O, or H was identified in the SPM corresponding to search prefix J, then the /3 bit of the corresponding SPM for that search prefix would not be set at level 1 in the b-tree 40". The third difference includes using one "handle present mask" bit (HPM) per search prefix within the leaf nodes to indicate whether the corresponding search prefix has been identified in an SPM at a higher level in a b-tree. Thus, at node 2-0 in FIG. 5A, for example, all mask bits are set to "0" because the search prefixes A, B and C are all represented at higher levels within the b-tree 40". In particular, the search prefix A is identified in the SPM corresponding to the search prefix J at the root node and the search prefixes B and C are identified in the SPM corresponding to the search prefix D at node 1-0. At node 2-1, the mask bits for search prefixes E and T are set to "1" because neither of these search prefixes are represented in an SPM at a higher level node in the b-tree 40". However, the mask bit for the search prefix V is set to "0" because the search prefix V is represented by the /2 bit in the SPM associated with the search prefix O at node 1-0.

Figure 5B:
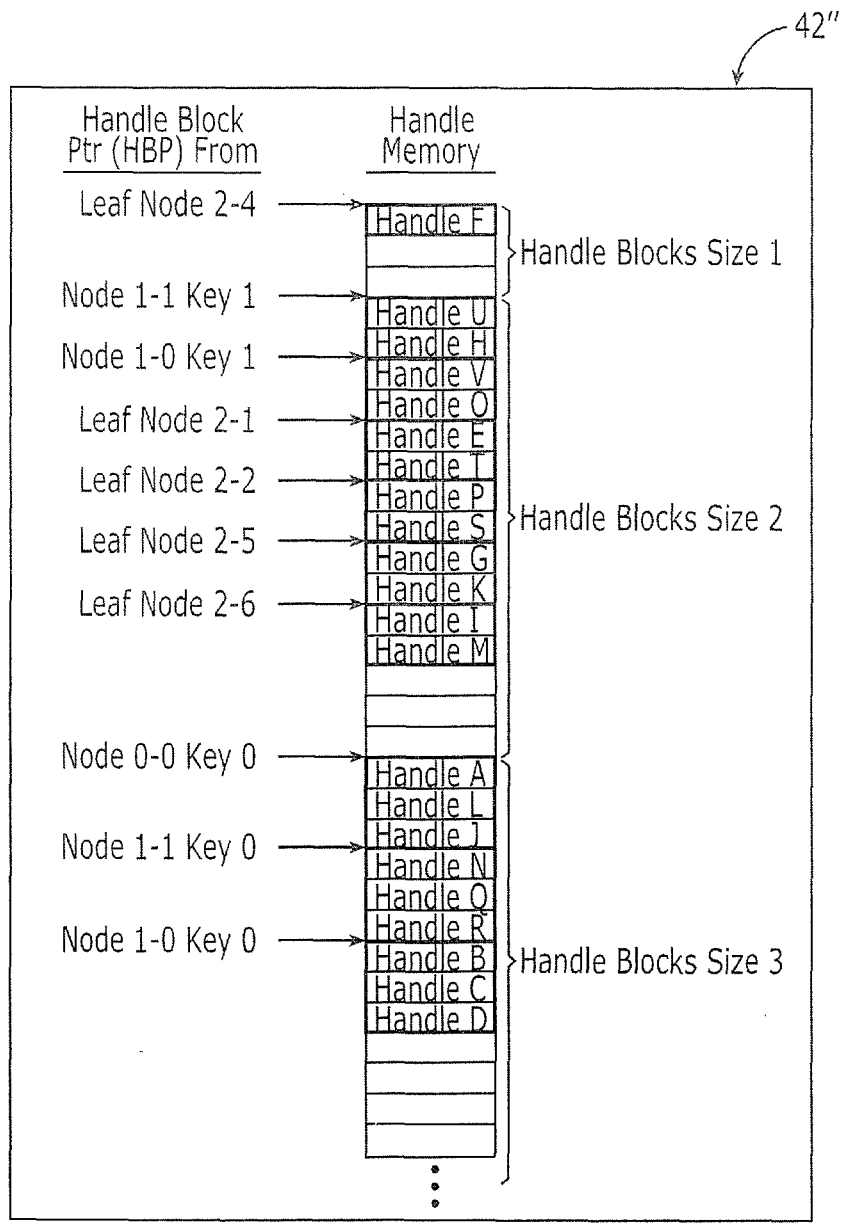
FIG. 5B illustrates an allocation of handle memory that supports the b-tree data structure of FIG. 5A.

Because each search prefix in the b-tree 40" is represented by only one set SPM bit or one set HPM bit, the capacity of a memory needed to support the corresponding handles for the search prefixes in the b-tree 40" can be significantly reduced relative to the handle memories 42 and 42' illustrated by FIGS. 4C.2 and 4D.2. This is because each handle only has to be stored once within a handle memory. As illustrated by FIG. 5B, an exemplary allocation of a handle memory 42" for the b-tree 40" of FIG. 5A includes a variable-sized handle memory block for each search prefix at the leaf parent level or higher and one variable-sized handle memory block for each leaf node. Each leaf node and each search prefix at the leaf parent level or higher may use a corresponding handle block pointer (HBP) to point to a respective handle memory block. Thus, for search prefix J at node 0-0, a respective HBP points to a handle memory block having a capacity of three handles corresponding search prefixes A, L and J. Similarly, for search prefix H (at node 1-1, key 1) an HBP points to a handle memory block having a capacity of two handles corresponding to search prefixes U and H. And, for leaf node 2-5, an HBP points to a handle memory block having a capacity of two handles corresponding to search prefixes G and K.

Finally, because fully specified search prefixes (e.g., search prefix R:170/8 at node 1-1, key 0) cannot be prefixes of other prefixes, they will not be represented in SPMs located at higher levels within the b-tree. Accordingly, whenever a fully specified search prefix is present at a leaf parent level or higher level within a b-tree, the HBP associated with this fully specified search prefix will point to a block of handle memory that is equivalent in size to the number of set bits within the SPM corresponding to this fully specified search prefix and the last handle in this block will correspond to the fully specified search prefix. This special case is best illustrated by the handle block in FIG. 5B that corresponds to the search prefix R at node 1-1, key 0. This handle block includes the handles N and Q, which correspond to set bits within the SPM for the search prefix R, and the additional handle R.

Figure 6:
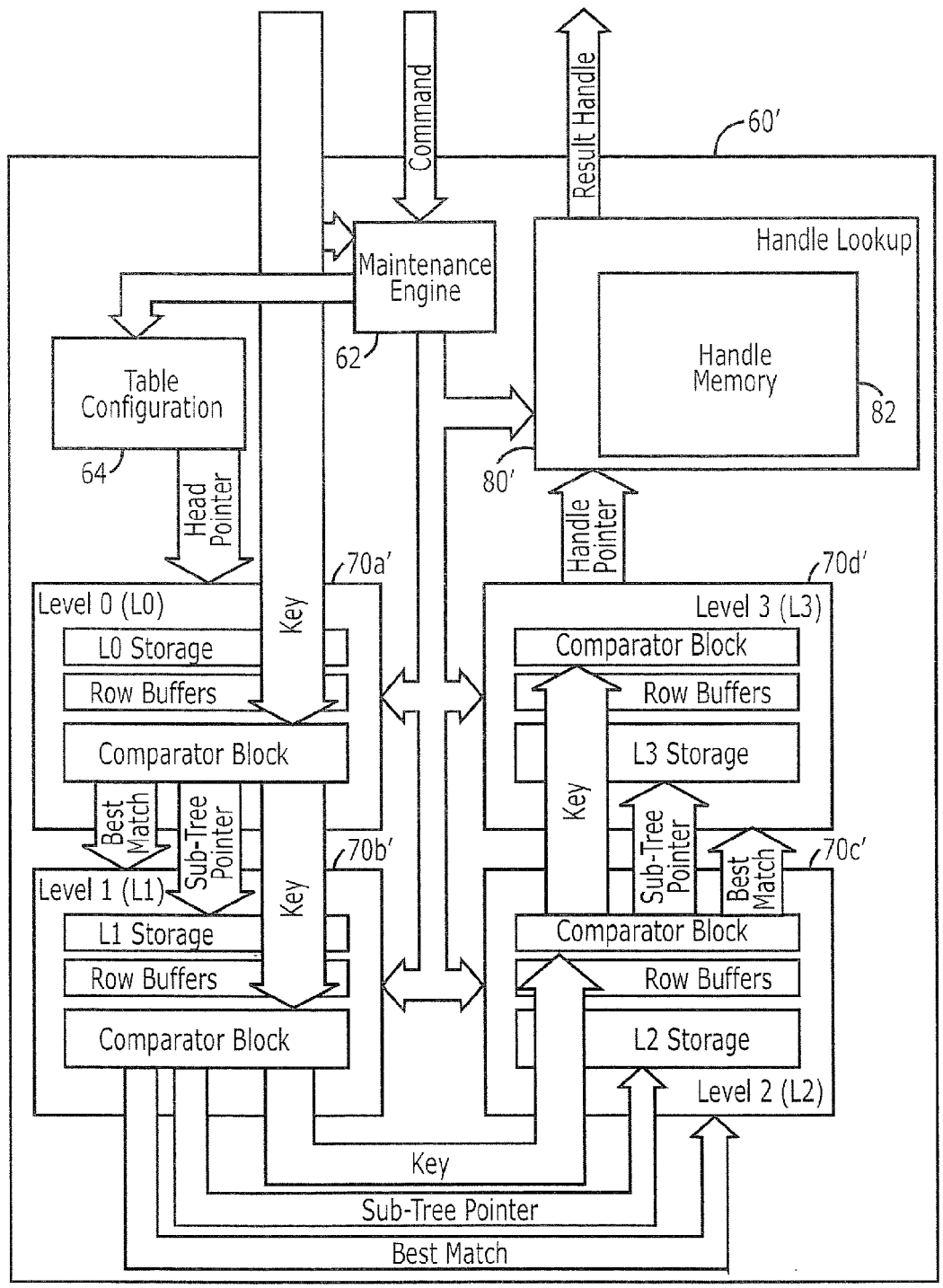
FIG. 6 is a block diagram of a pipelined search engine device that supports the b-tree data structure of FIG. 4B and an allocation of handle memory, according to an embodiment of the invention.

FIG. 6 illustrates a block diagram of a pipelined search engine device 60 that supports the above-described b-tree data structures (with SPMs) and handle memory and is responsive to applied search keys and commands. This search engine device 60, which supports multiple four-level b-trees as separate tables (i.e., databases), which share the same node storage and search logic, includes a plurality of pipeline stages 70a-70d dedicated to each b-tree level and a separate pipeline stage 80 for the final result handle lookup and generation of result handles. Alternative embodiments of the search engine device 60 can support b-trees having more or less than four levels. The first pipeline stage 70a represents a Level 0 block (L0) of the b-tree containing Level 0 storage elements, row buffers (optional in some designs) and comparator logic. The first pipeline stage 70a is responsive to a head pointer and a key. The second pipeline stage 70b represents a Level 1 block (L1) containing Level 1 storage elements, row buffers (optional in some designs) and comparator logic. The second pipeline stage 70b is responsive to a sub-tree pointer, a best match result generated by the first pipeline stage 70a and the key. Similarly, the third pipeline stage 70c represents a Level 2 block (L2) containing Level 2 storage elements, row buffers (optional in some designs) and comparator logic. The third pipeline stage 70c is responsive to a sub-tree pointer, a best match result generated by the second pipeline stage 70b and the key. The fourth pipeline stage 70d represents a Level 3 block (L3) containing Level 3 storage elements, row buffers (optional in some designs) and comparator logic. The fourth pipeline stage 70d, which generates a handle block pointer, is responsive to a sub-tree pointer, a best match result generated by the third pipeline stage 70c and the key. The final pipeline stage is a handle lookup stage 80, which performs handle lookup operations within a handle memory 82 to thereby generate a result handle in response to the handle block pointer.

A table maintenance engine 62 is also provided, which integrates with the four pipeline stages 70a-70d and the handle lookup stage 80. This table maintenance engine 62 performs operations including search key insertion and deletion operations during idle search clock cycles. A table configuration circuit 64 is provided, which can support multiple search trees and map a table ID associated with a received search request to a tree head pointer (HEAD POINTER) for the corresponding table. Because of the pipelined structure of the search engine device 60, the maximum search rate can equal the maximum clock speed supported by the four pipeline stages 70a-70d and the handle lookup stage 80.

The table maintenance engine 62 receives search keys and commands on behalf of the search engine device 60 and forwards search commands to the table configuration circuit 64. The table maintenance engine 62 also queues up any key insert or key delete commands (i.e., update commands) it receives for processing because key insertion and key deletion typically cannot be completed in a simple single pass through the search engine pipeline. When idle command cycles indicate there are memory access opportunities available to perform table maintenance accesses on the memories (L0, L1, L2, L3) within each pipeline stage 70a-70d and the handle memory 82 within the handle lookup stage 80, the maintenance engine 62 performs maintenance accesses corresponding to portions of a key insert or key delete request. The maintenance engine 62 can process an insert or delete request and manage search memory node allocation to thereby allocate free nodes when needed to process key inserts and returning freed nodes to a pool when freed during key deletes. To ensure search coherency and permit searching while the maintenance engine 62 processes a key update command, the maintenance engine 62 makes a copy of nodes that must be modified while processing updates and only modifies these "temporary" copies. Once all node copies have been modified at all necessary levels for a key update, the maintenance engine 62 updates pointers in all necessary search levels to point to the modified node copies it was working on and reclaims the original nodes, which were copied, for future use. These pointers are updated in a manner that preserves search coherency on every lookup.

Once all temporary node copies at all levels have been properly updated, a special command is executed within the pipeline of stages to thereby cause each level of the b-tree to point to the node copies and reclaim the nodes that are being replaced. This update process propagates through the pipeline across all level at the same speed as a search command. Accordingly, all searches that enter the pipeline before the special command will search against a database before any changes pertaining to the update are applied, but any searches that enter the pipeline after the special command will search against a database that appears to have been instantly and completely modified to reflect the update. In this manner, it is not necessary to temporarily stall the multiple levels of the search engine device 60 while an update is being performed.

The table configuration circuit 64 receives search commands from the maintenance engine 62, which include a table ID for the table to be searched. The table configuration circuit 64 then maps the table ID, corresponding to a unique b-tree within the search engine device 60, to a root tree node pointer in the Level 0 block 70a. The table configuration circuit 64 then forwards this pointer to the Level 0 block 70a instructing it to perform a search starting at the root node pointed to by the root tree node pointer.

Each of the Level 0, Level 1 and Level 2 blocks 70a-70c corresponds to one of the upper three levels of an SPM b-tree. Each level receives a search key, a sub-tree pointer and an indication of the best match found by the previous levels in the search. In the case of the Level 0 block 70a, which is utilized as the root level when the height of the search tree equals four, this best match input indication is always null. A Level 0, Level 1 or Level 2 block reads a search node from its node storage based on the sub-tree pointer it receives and buffers it in a set of flip-flops within its respective row buffer sub-block. Each node stores a set of keys, SPM bit-masks and sub-tree pointers. The comparator sub-block compares the search key to all of the keys and the SPM bit-masks read from the node storage sub-block and determines the best match for the search key, if any, and also determines which of the node's sub-tree pointers the search should follow for the next level of the search. The Level 0, Level 1 or Level 2 block forwards the sub-tree pointer it finds to the next lower level block along with the search key. If the next lower level block finds a new best match, then this best match for the search key is forwarded to the next lower level search stage. However, if no new best match is found, then the best match from the previous higher stage is forwarded to the next stage.

The Level 4 block corresponds to the leaf level of the SPM b-tree. It receives a search key, sub-tree pointer and any indication of a best match from the previous levels in the search. The Level 4 block reads a search node from its node storage based on the sub-tree pointer that it receives and buffers it in a set of flip-flops within its row buffer sub-block. The comparator sub-block compares the search key to all of the keys read from the node storage sub-block and determines a best match, if any. If the Level 4 block finds a new best match for the search key, then it forwards its own best match as the handle pointer to the handle lookup block 80. Otherwise, if no new best match is found, then the best match received from the prior stage is passed as the handle pointer.

The handle lookup block 80 receives an indication of the best match found by the Level 0-Level 3 search stages 70a-70d and uses the best match as an index to lookup a search result handle in the handle memory 82. In response to the index, the handle memory 82 outputs a retrieved handle as the result handle (i.e., the search result).

Figure 4B:
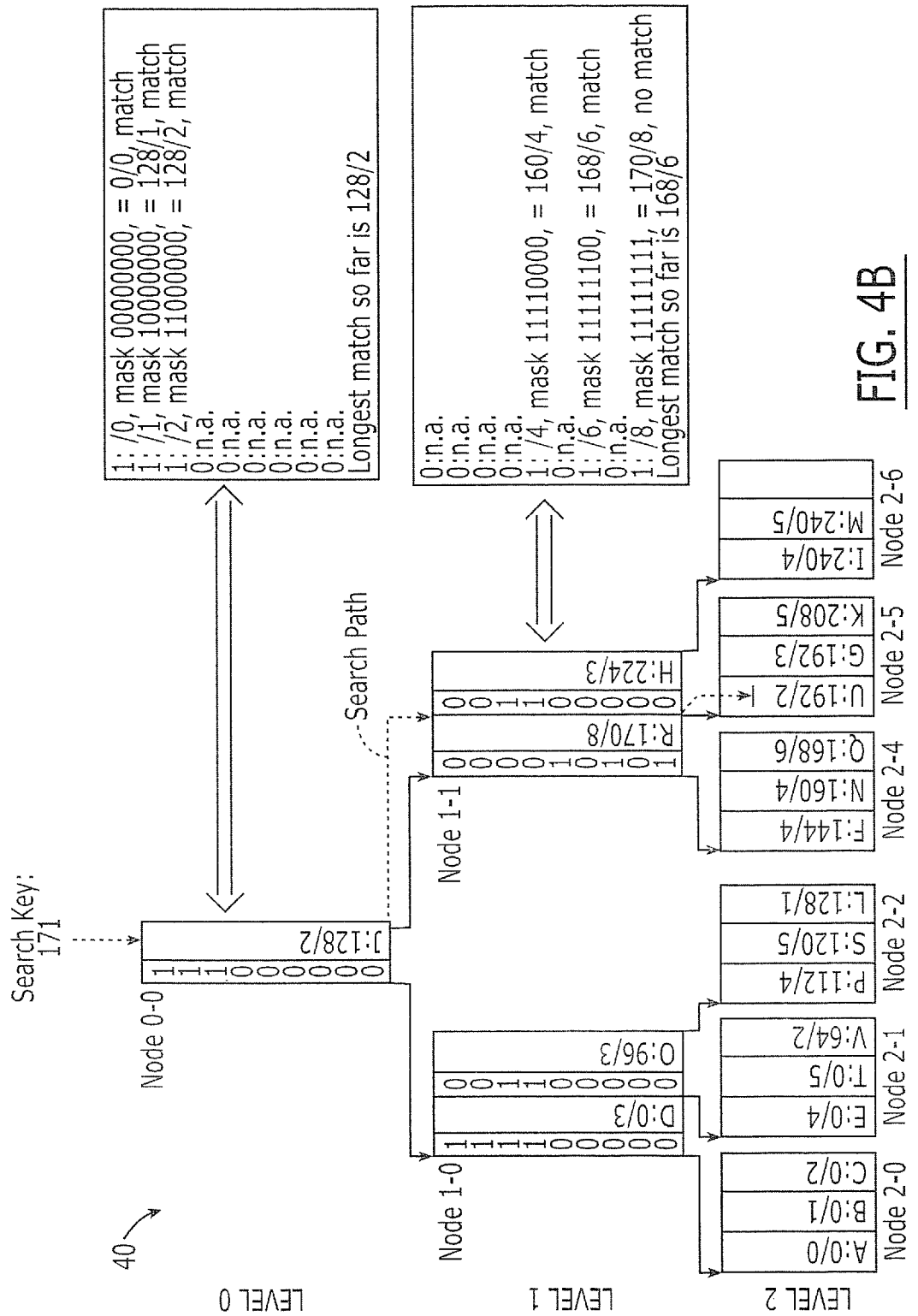
FIG. 4B illustrates an annotated three-level b-tree data structure that contains search prefixes and span prefix masks (SPMs) according to an embodiment of the present invention.
Figure 4C:
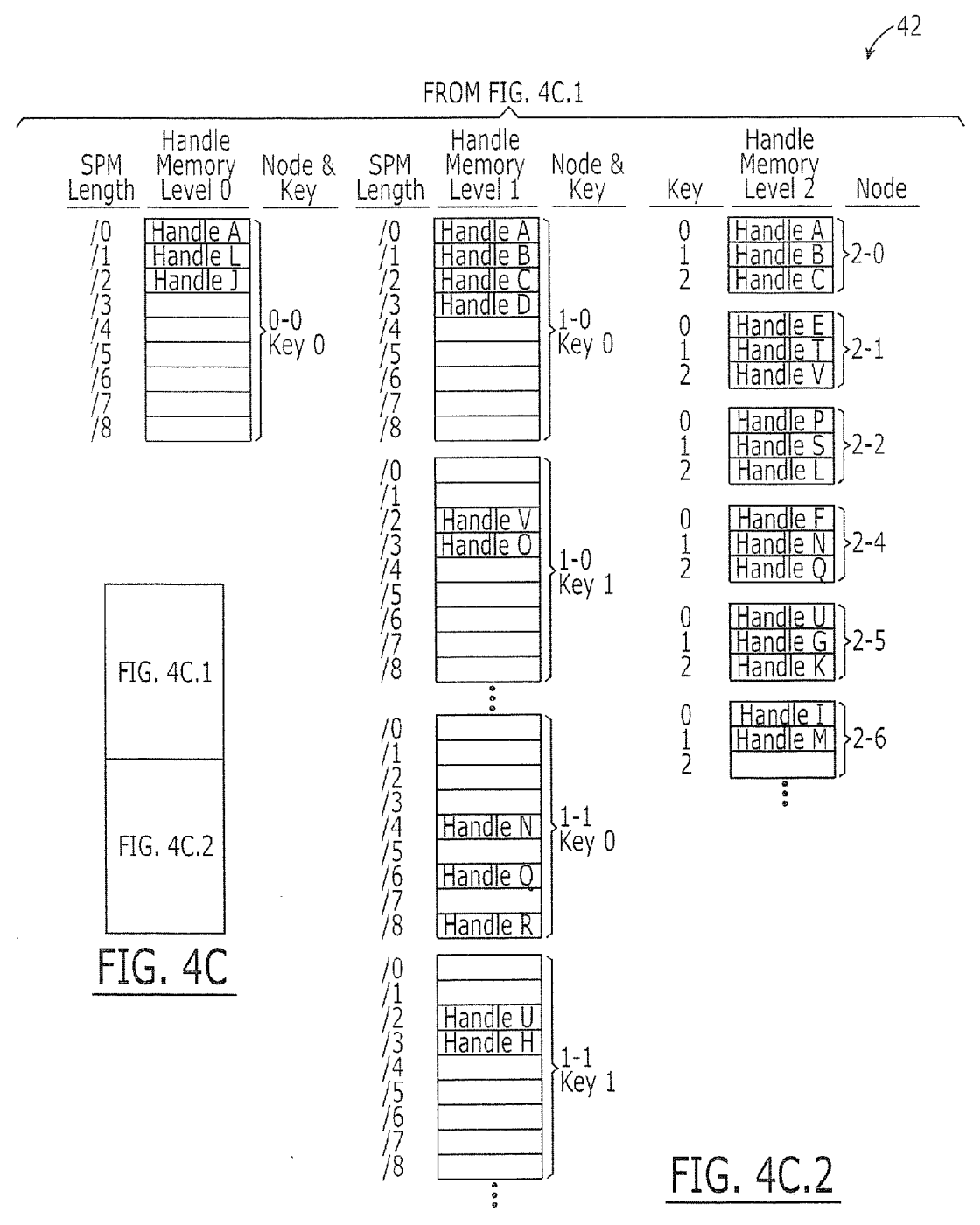

FIGS. 7A-7C and 8 illustrate methods of encoding multi-segment search keys according to additional embodiments of the present invention. In particular, FIG. 7A illustrates one embodiment of encoding multi-segment search keys that can be used in search engines configured to support keys of variable length. These search engines include those illustrated and described above with respect to FIG. 6 and in U.S. application Ser. No. 11/674,474, filed Feb. 13, 2007; Ser. No. 11/674,481, filed Feb. 13, 2007; and Ser. No. 11/184,243, filed Mar. 14, 2007, the disclosures of which are hereby incorporated herein by reference. In the example illustrated by FIG. 7A, the variable lengths of the search keys supported by the search engine are equivalent to integer multiples of a key segment length, which is shown as a four bit segment length. Thus, the search key R:170/8, which is illustrated as residing at node 1-1 of the b-tree 40 of FIG. 4B, can be specified as an 8-bit key (R:170/8=10101010b) containing two 4-bit segments (KEY_SEG[3:0]). These two segments are illustrated as Segment 0 containing the more significant key bits 7-4 and Segment 1 containing the less significant key bits 3-0. The span prefix mask (SPM) associated with the search key R:170/8 is also encoded as an 8-bit mask containing two 4-bit segments (SPM_SEG [3:0]). The 8-bit SPM for search key R:170/8 is encoded as 0001b associated with Segment 0 and 0101b associated with Segment 1. As shown by FIGS. 4A-4B and 7A, each set bit (e.g., logic 1 value) within an SPM encodes the value of a search key within the tree 40 that is a prefix match to the key for which the SPM pertains. Thus, with respect to Segment 0 of the search key R:170/8, the SPM_SEG[3:0]=0001b identifies the search key N, which has a value of 160 and a prefix length of four bits (i.e., N:160/4=1010XXXXb, where "X" is a don't care value). Similarly, with respect to Segment 1 of the search key R:170/8, the SPM_SEG[3:0]=0101b identifies the search key Q, which has a value of 168 and a prefix length of six bits (i.e., Q:168/6=101010XXb), and also identifies the search key to which the SPM pertains (i.e., R:170/8). The search key to which the SPM pertains is identified by the rightmost set bit (i.e., rightmost logic 1 value) within the multi-segment SPM. Accordingly, the multi-segment encoding of the span prefix mask (SPM) specifies not only those search keys (e.g., Q:168/6 and N:160/4) that are prefix matches to the search key to which the SPM pertains (e.g., R:170/8), but also specifies the prefix length of the search key to which the SPM pertains. FIGS. 4A-4B also illustrate how the least significant set bit within an SPM (i.e., set bit closest to /8 bit position of the SPM) identifies the prefix length of the search key to which the SPM pertains.

The multi-segment encoding of a search key may also include the generation of a segment length indicator for each of the search key segments. These segment length indicators (e.g., SEG_LEN_4) illustrated by FIG. 7A are single bit indicators that specify whether the corresponding key segment (Segment 0, Segment 1) of the search key is fully specified. Thus, for the search key R:170/8, which is a fully specified 8-bit key, both segment length indicators have logic 1 set bits, which designate fully specified segments.

FIG. 7B illustrates another example of the encoding methodology illustrated by FIG. 7A, for the case where the leftmost search key at node 1-1 in the b-tree 40 of FIG. 4B equals R':170/7. In FIG. 7B, the segment length indicator associated with Segment 1 of the multi-segment search key equals a logic 0 value. This logic 0 value specifies that Segment 1 of the multi-segment search key is not fully specified. Instead, as illustrated by the rightmost bit of the multi-segment SPM, the prefix length of the multi-segment search key is seven bits (i.e., /7 bit of SPM equals 1 and /8 bit of SPM equals 0), which confirms that Segment 1 of the multi-segment search key is not fully specified. FIG. 7O illustrates an alternative encoding methodology relative to the methodology illustrated by FIG. 7B. In particular, the encoding methodology of FIG. 7C illustrates how the rightmost set bit (e.g., rightmost logic 1 value) within a non-fully specified search key segment can be utilized to specify the prefix length of the multi-segment search key. Using this methodology, the rightmost set bit identifies that all bits to the left of the rightmost set bit are specified bits of the search key and that the rightmost set bit and all bits to the right of the rightmost set bit represent don't care bits of the search key. Thus, in FIG. 7C, the rightmost set bit within Segment 1, which is the leftmost segment that is not fully specified, identifies a prefix length of seven bits. This prefix length of seven bits is equivalent to the prefix length specified by the multi-segment SPM, which includes a rightmost set bit at the /7 bit position.

Figure 8:
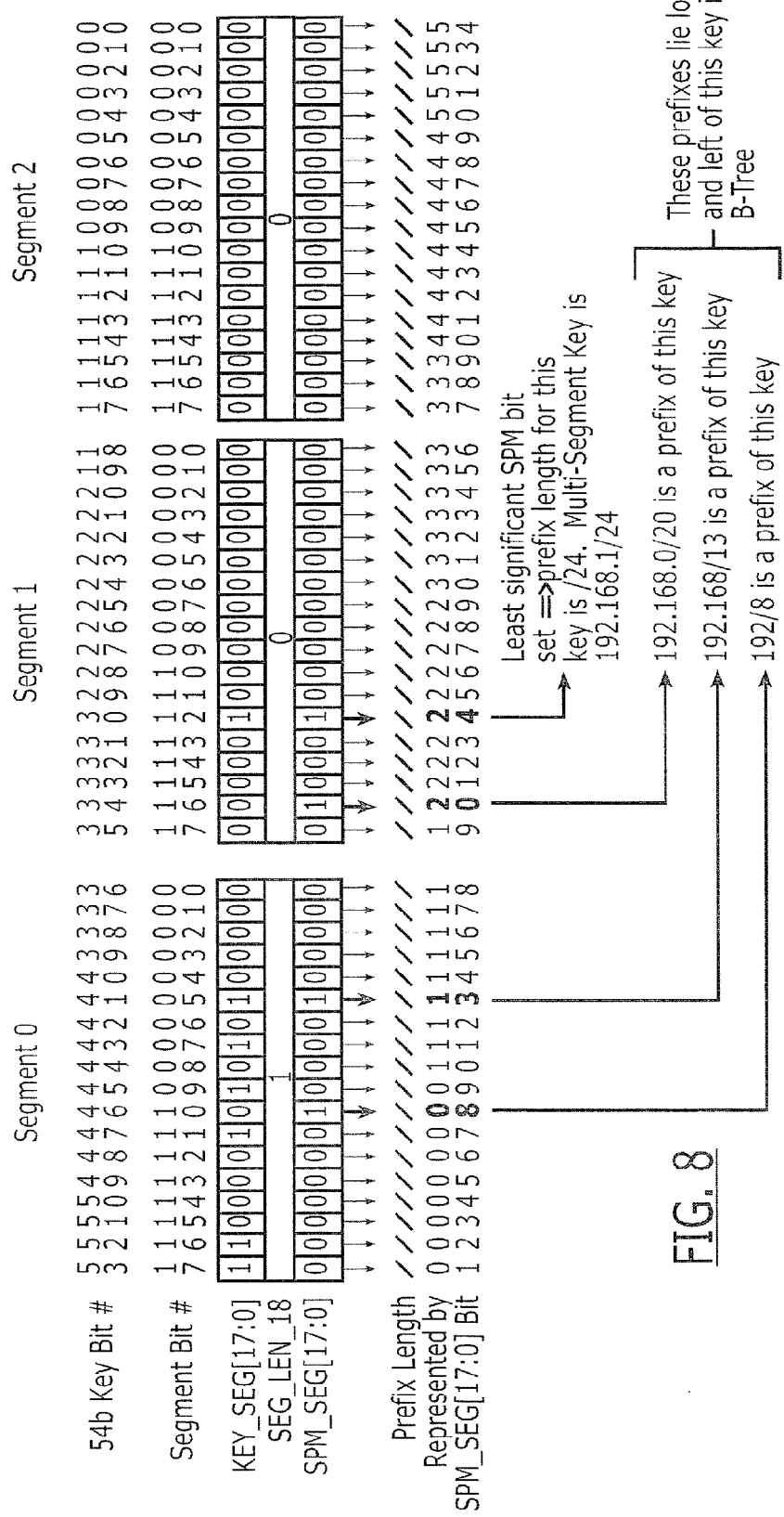
FIG. 8 illustrates an encoding of a multi-segment search key and span prefix mask within a b-tree of search keys, according to an embodiment of the present invention.

FIG. 8 illustrates an encoding methodology that is consistent with the encoding methodology illustrated by FIG. 7A, for the case where a search key of 54 bits is partitioned into three segments of 18 bits per segment. In particular, FIG. 8 illustrates the multi-segment encoding associated with a search key equivalent to 192.168.1/24. The rightmost set bit within the multi-segment SPM identifies a prefix length of 24 bits and the segment length indicators for Segments 1 and 2 indicate that neither Segment 1 nor Segment 2 of the multi-segment search key 192.168.1/24 are fully specified. Moreover, the set bits to the left of the rightmost set bit within the 54 bit SPM confirm that the following three keys are prefix matches to the multi-segment search key 192.168.1/24: 192/8, 192.168/13 and 192.168.0/20. As described above with respect to FIGS. 4A-4B, these three keys (i.e., 192/8, 192.168/13 and 192.168.0/20) would lie lower and to the left of the search key 192.168.1/24 within a b-tree containing these multi-segment keys.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An integrated circuit device, comprising:
a pipelined search engine configured to search a tree comprising a plurality of nodes, each of the plurality of nodes comprising a search prefix, and at least one of the search prefixes being associated with a mask configured to assist in longest prefix match (LPM) detection during search of the tree, wherein each bit of the mask is generated by:
performing a Boolean operation on a different vector in a set of vectors and the search prefix associated with the mask; and
determining whether a result of the Boolean operation is equal to or shorter than the search prefix associated with the mask.

2. The integrated circuit device of claim 1, wherein the search prefixes are multi-segment search prefixes and wherein the tree further utilizes a segment length indicator for each of a plurality of segments of the multi-segment search prefixes that identifies whether a corresponding segment of the plurality of segments of the multi-segment search prefix is a fully specified segment.

3. The integrated circuit device of claim 1, wherein the tree is configured to support at least a first multi-segment search prefix and a multi-bit length indicator that identifies segments of the first multi-segment search prefix that are fully specified.

4. The integrated circuit device of claim 1, wherein the mask is a binary number.

5. The integrated circuit device of claim 1, wherein the Boolean operation is a bitwise AND operation.

6. The integrated circuit device of claim 1, wherein the bit of the mask is a logic "1" if the result is equal to or shorter than the search prefix, and wherein the bit of the mask is a logic "0" if the result is not equal to or shorter than the search prefix.

7. An integrated circuit device, comprising:
a search engine configured to search a tree of multi-segment search prefixes that are stored with a plurality of multi-bit length indicators that identify segments of the multi-segment search prefixes that are fully specified, wherein the search engine is further configured to search a plurality of masks that are associated with a corresponding plurality of multi-segment search prefixes located at non-leaf levels within the tree and encode prefix lengths of the plurality of multi-segment search prefixes, and wherein each bit of a respective mask is generated by:
performing a Boolean operation on a different vector in a set of vectors and the multi-segment search prefix associated with the respective mask; and
determining whether a result of the Boolean operation is equal to or shorter than the multi-segment search prefix associated with the respective mask.

8. The integrated circuit device of claim 7, wherein each of the plurality of masks is a binary number.

9. The integrated circuit device of claim 7, wherein the Boolean operation is a bitwise AND operation.

10. A method of encoding a prefix length of a search prefix to be inserted into a multi-way tree, the method performed by a search engine and comprising:
generating, using an integrated circuit device, a mask for the search prefix, wherein each bit of the mask is generated by:
performing a Boolean operation on a different vector in a set of vectors and the search prefix associated with the mask; and
determining whether a result of the Boolean operation is equal to or shorter than the search prefix associated with the mask.

11. The method of claim 10, wherein the mask is a binary number.

12. The method of claim 10, wherein the Boolean operation is a bitwise AND operation.

13. A method of encoding a multi-segment search prefix within a multi-way tree of search prefixes, the method performed by a search engine and comprising:
generating, using an integrated circuit device, a multi-segment mask associated with the multi-segment search prefix, wherein each bit of the multi-segment mask is generated by:
performing a Boolean operation on a different vector in a set of vectors and the multi-segment search prefix associated with the multi-segment mask; and
determining whether a result of the Boolean operation is equal to or shorter than the multi-segment search prefix associated with the multi-segment mask; and
generating a segment length indicator for at least one of the segments of the multi-segment search prefix that identifies whether the corresponding segment of the multi-segment search prefix is a fully specified segment.

14. The method of claim 13, wherein the multi-segment mask represents an encoded prefix length of the multi-segment search prefix.

15. The method of claim 13, wherein the multi-way tree is a b-tree.

16. The method of claim 14, wherein the multi-segment mask is a binary number.

17. The method of claim 13, wherein the Boolean operation is a bitwise AND operation.

18. A method of encoding a prefix length of a search prefix to be inserted into a b-tree, the method performed by a search engine and comprising:
generating, using an integrated circuit device, a mask for the search prefix, each bit of the mask being generated by:

performing a Boolean operation on a different vector in a set of vectors and the search prefix associated with the mask; and determining whether a result of the Boolean operation is equal to or shorter than the search prefix associated with the mask.

19. The method of claim 18, wherein the search prefix is encoded as a multi-segment search prefix that utilizes segment length indicators to identify segments of the multi-segment search prefixes that are fully specified.

20. The integrated circuit device of claim 18, wherein the mask is a binary number.

21. The method of claim 18, wherein the Boolean operation is a bitwise AND operation.

* * * * *